(12) United States Patent
Katou

(10) Patent No.: US 11,171,356 B2
(45) Date of Patent: Nov. 9, 2021

(54) SECONDARY BATTERY AND METHOD FOR USING SECONDARY BATTERY

(71) Applicant: Envision AESC Energy Devices Ltd., Sagamihara (JP)

(72) Inventor: Yuukou Katou, Sagamihara (JP)

(73) Assignee: Envision AESC Energy Devices Ltd., Sagamihara (JP)

(*) Notice: Subject to any disclaimer, the term of this patent is extended or adjusted under 35 U.S.C. 154(b) by 42 days.

(21) Appl. No.: 16/480,458

(22) PCT Filed: Jan. 25, 2018

(86) PCT No.: PCT/JP2018/002258
§ 371 (c)(1),
(2) Date: Jul. 24, 2019

(87) PCT Pub. No.: WO2018/155059
PCT Pub. Date: Aug. 30, 2018

(65) Prior Publication Data
US 2019/0386335 A1    Dec. 19, 2019

(30) Foreign Application Priority Data

Feb. 22, 2017    (JP) .............................. JP2017-031350

(51) Int. Cl.
*H01M 10/052*    (2010.01)
*H01M 10/44*    (2006.01)
*H01M 10/48*    (2006.01)

(52) U.S. Cl.
CPC ......... *H01M 10/052* (2013.01); *H01M 10/44* (2013.01); *H01M 10/48* (2013.01)

(58) Field of Classification Search
CPC ..... H01M 10/052; H01M 10/44; H01M 10/48
See application file for complete search history.

(56) References Cited

U.S. PATENT DOCUMENTS

2010/0028771 A1*  2/2010  Zhou ................... H01M 10/052
                                                            429/163
2020/0052351 A1*  2/2020  Katou ................... H01M 4/483

FOREIGN PATENT DOCUMENTS

JP          5117638 B2    1/2013
JP       2013-127845 A    6/2013
(Continued)

OTHER PUBLICATIONS

International Search Report of PCT/JP2018/002258 dated Mar. 20, 2018 [PCT/ISA/210].

*Primary Examiner* — Olatunji A Godo
(74) *Attorney, Agent, or Firm* — Sughrue Mion, PLLC

(57) ABSTRACT

A secondary battery of the present invention includes at least a positive electrode, a negative electrode, a separation layer that spatially separates the positive electrode and the negative electrode, and an ion conductor that is held between the positive electrode and the negative electrode and has a function of conducting ions between the positive electrode and the negative electrode. In addition, in an initial stage of using the secondary battery, the secondary battery has a characteristic of a potential increase rate of the positive electrode immediately before completion of full charging being smaller than a potential decrease rate of the negative electrode immediately before the completion of full charging and a characteristic of a potential decrease rate of the positive electrode immediately before completion of full discharging being smaller than a potential increase rate of the negative electrode immediately before the completion of full discharging.

8 Claims, 8 Drawing Sheets

(56) References Cited

FOREIGN PATENT DOCUMENTS

| JP | 2017-009540 A | 1/2017 |
|----|---------------|--------|
| WO | 2011/125213 A1 | 10/2011 |

* cited by examiner

SECONDARY BATTERY AND METHOD FOR USING SECONDARY BATTERY

CROSS REFERENCE TO RELATED APPLICATIONS

This application is a National Stage of International Application No. PCT/JP2018/002258, filed Jan. 25, 2018, claiming priority to Japanese Patent Application No. 2017-031350, filed Feb. 22, 2017, the contents of all of which are incorporated herein by reference in their entirety.

TECHNICAL FIELD

The present invention relates to a secondary battery and a method for using a secondary battery.

BACKGROUND ART

As a technique regarding the extension of the service lives of secondary batteries such as lithium ion secondary batteries, for example, a technique described in Patent Document 1 is exemplified.

Patent Document 1 describes a method for charging and discharging a lithium secondary battery including a positive electrode having a positive electrode active material capable of storing and discharging lithium ions, a negative electrode having a negative electrode active material capable of storing and discharging lithium ions, a separator disposed between the positive electrode and the negative electrode, and an electrolyte having a lithium ion conduction property, in which the positive electrode active material includes a lithium-containing transition metal oxide, a reversible capacity of the negative electrode is greater than an available capacity of the positive electrode, and first charging and discharging in which discharging is ended by discharging the charged positive electrode until a first potential VDp1 that is smaller than 2.7 V with reference to lithium metal is reached is carried out.

RELATED DOCUMENT

Patent Document

[Patent Document 1] Japanese Patent No. 5117638

SUMMARY OF THE INVENTION

Technical Problem

In the method of Patent Document 1, it is necessary to control the potential of the positive electrode during discharging to reach a value that is lower than 2.7 V (Li$^+$/Li). The positive electrode and the negative electrode deteriorate separately depending on environments under which the electrodes are used, and thus the relationship between a positive electrode potential and a negative electrode potential changes in association with the deterioration. Therefore, the positive electrode potential cannot be estimated from a potential between the positive electrode and the negative electrode, and there is a problem in that a procedure of accurately evaluating the positive electrode potential becomes necessary. In addition, when the deterioration increases the potential of the negative electrode up to approximately 2.7 V (Li$^+$/Li) before the potential of the positive electrode becomes lower than 2.7 V (Li$^+$/Li) during discharging, and thus the potential between the positive electrode and the negative electrode becomes near zero voltage, a possibility of an incapability of setting the potential of the positive electrode to be lower than 2.7 V (Li$^+$/Li) can be considered. In this case, there is another problem in that it becomes impossible to use the positive electrode and the negative electrode as a battery even when a capacity large enough to operate the electrodes remains.

The present invention has been made in consideration of the above-described circumstance and provides a secondary battery having a long product service life and a method for using a secondary battery capable of extending the product service life.

Solution to Problem

The present inventors repeated intensive studies in order to achieve the above-described object. As a result, the present inventors found that, when the charging and discharging characteristics of a positive electrode and a negative electrode in an initial stage of using a secondary battery are set in a specific relationship, it is possible to extend the product service life of the secondary battery and completed the present invention.

That is, according to the present invention, there is provided a secondary battery including at least a positive electrode, a negative electrode, a separation layer that spatially separates the positive electrode and the negative electrode, and an ion conductor that is held between the positive electrode and the negative electrode and has a function of conducting ions between the positive electrode and the negative electrode, in which, in an initial stage of using the secondary battery, the secondary battery has a characteristic of a potential increase rate of the positive electrode immediately before completion of full charging being smaller than a potential decrease rate of the negative electrode immediately before the completion of full charging and a characteristic of a potential decrease rate of the positive electrode immediately before completion of full discharging being smaller than a potential increase rate of the negative electrode immediately before the completion of full discharging.

In addition, according to the present invention, there is provided a method for using a secondary battery including at least a positive electrode, a negative electrode, a separation layer that spatially separates the positive electrode and the negative electrode, and an ion conductor that is held between the positive electrode and the negative electrode and has a function of conducting ions between the positive electrode and the negative electrode, in which, in an initial stage of using the secondary battery, the secondary battery is used under a condition of a potential increase rate of the positive electrode immediately before completion of full charging being smaller than a potential decrease rate of the negative electrode immediately before the completion of full charging and is used under a condition of a potential decrease rate of the positive electrode immediately before completion of full discharging being smaller than a potential increase rate of the negative electrode immediately before the completion of full discharging.

Advantageous Effects of Invention

According to the present invention, it is possible to provide a secondary battery having a long product service life and a method for using a secondary battery capable of extending the product service life.

BRIEF DESCRIPTION OF THE DRAWINGS

The above-described object and other objects, characteristics, and advantages will be further clarified using a preferred embodiment described below and the accompanying drawings below.

FIG. 2(a) shows an example of the relationship between the charge and discharge characteristics of the positive electrode and the charge and discharge characteristics of the negative electrode in an initial stage of using the secondary battery, and FIG. 2(b) shows an example of the relationship between the charge and discharge characteristics of the positive electrode and the charge and discharge characteristics of the negative electrode in a late stage of using the secondary battery.

DESCRIPTION OF EMBODIMENTS

Figure 1:
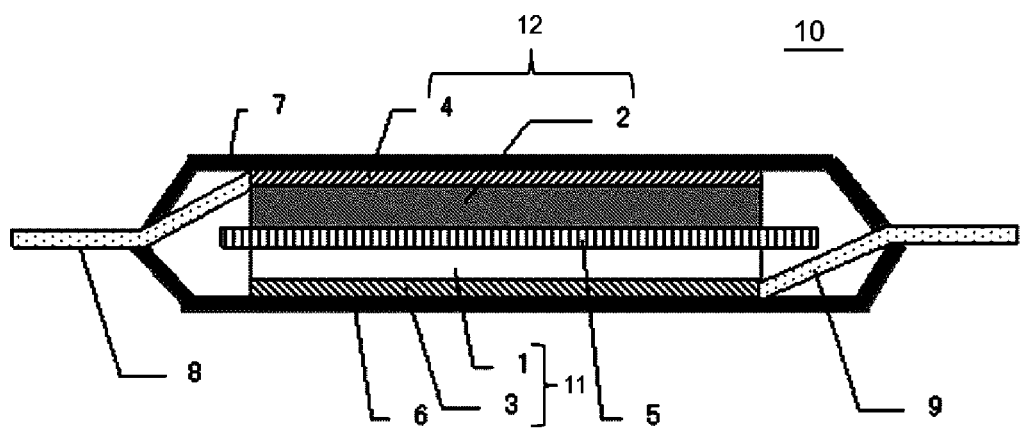
FIG. 1 is a cross-sectional view showing an example of a structure of a secondary battery of an embodiment according to the present invention.

Hereinafter, an embodiment of the present invention will be described using drawings. In all of the drawings, the same constituent element will be given the same reference sign and will not be repeated. In addition, individual constituent elements in the drawings show shapes, sizes, and disposition relationships schematically enough to understand the present invention, and thus the shapes, the sizes, and the disposition relationships do not match actual ones. In addition, in the present embodiment, unless particularly otherwise described, numerical ranges "A to B" indicate equal to and more than A and equal to and less than B.

<Secondary Battery and Method for Using Secondary Battery>

Figure 2:
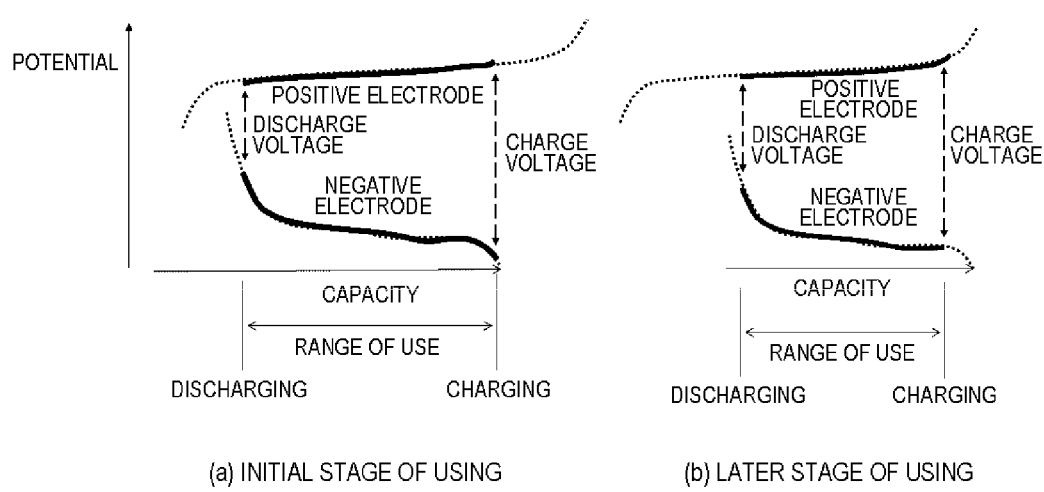
FIG. 2 is views showing examples of relationships between charge and discharge characteristics of a positive electrode and charge and discharge characteristics of a negative electrode in the secondary battery of the embodiment of the present invention.

Hereinafter, a secondary battery 10 according to the present embodiment and a method for using the secondary battery 10 will be described. FIG. 1 is a cross-sectional view showing an example of a structure of the secondary battery 10 of an embodiment according to the present invention. FIG. 2 is views showing examples of relationships between charge and discharge characteristics of a positive electrode 11 and charge and discharge characteristics of a negative electrode 12 in the secondary battery 10 of the embodiment of the present invention, FIG. 2(a) shows an example of the relationship between the charge and discharge characteristics of the positive electrode 11 and the charge and discharge characteristics of the negative electrode 12 in an initial stage of using the secondary battery 10, and FIG. 2(b) shows an example of the relationship between the charge and discharge characteristics of the positive electrode 11 and the charge and discharge characteristics of the negative electrode 12 in a late stage of using the secondary battery 10.

As shown in FIG. 1, the secondary battery 10 according to the present embodiment includes at least the positive electrode 11, the negative electrode 12, a separation layer 5 that spatially separates the positive electrode 11 and the negative electrode 12, and an ion conductor that is held between the positive electrode 11 and the negative electrode 12 and has a function of conducting ions between the positive electrode 11 and the negative electrode 12. In addition, in an initial stage of using the secondary battery 10, the secondary battery has a characteristic of a potential increase rate of the positive electrode 11 immediately before the completion of full charging being smaller than a potential decrease rate of the negative electrode 12 immediately before the completion of full charging and a characteristic of a potential decrease rate of the positive electrode 11 immediately before the completion of full discharging being smaller than a potential increase rate of the negative electrode 12 immediately before the completion of full discharging.

That is, in the initial stage of using the secondary battery 10, the secondary battery is used under a condition of the potential increase rate of the positive electrode 11 immediately before the completion of full charging being smaller than the potential decrease rate of the negative electrode 12 immediately before the completion of full charging and is used under a condition of the potential decrease rate of the positive electrode 11 immediately before the completion of full discharging being smaller than the potential increase rate of the negative electrode 12 immediately before the completion of full discharging.

Here, in the present embodiment, the completion of full discharging refers to a state in which the voltage of the battery reaches a voltage set as a discharge end voltage, and the completion of full charging refers to a state in which the voltage of the battery reaches a voltage set as a charge end voltage. Meanwhile, the discharge end voltage and the charge end voltage are set by a combination of the positive electrode and the negative electrode and can be determined on the basis of well-known information.

In addition, in the present embodiment, in the later state of using refers to, in a period of time of the secondary battery 10 being used, a point in a time at which some of conduction ions that contribute to charging and discharging decrease due to the absorption into a reaction product by the decomposition of an electrolytic solution or the like, an available portion in the capacity of the positive electrode 11 shifts, and the potential increase rate of the positive electrode 11 immediately before the completion of full charging becomes larger than the potential decrease rate of the negative electrode 12 immediately before the completion of full charging.

The positive electrode 11 has a positive electrode current collector 3 constituted of a metal foil such as an aluminium foil or the like and a positive electrode active material layer 1 containing a positive electrode active material provided on one surface of the positive electrode current collector 3.

The negative electrode 12 has a negative electrode current collector 4 constituted of a metal foil such as a copper foil or the like and a negative electrode active material layer 2 containing a negative electrode active material provided on one surface of the negative electrode current collector 4.

The positive electrode 11 and the negative electrode 12 are laminated together through the separation layer 5 so that the positive electrode active material layer 1 and the negative electrode active material layer 2 face each other. As the separation layer 5, for example, a separator constituted of a microporous film made of a non-woven fabric or a polyolefin (polypropylene, polyethylene, or the like) can be used.

An electrode element constituted of the positive electrode 11, the separation layer 5, and the negative electrode 12 are stored in, for example, a container constituted of exterior bodies 6 and 7. As the exterior bodies 6 and 7, an aluminium laminate film can be used.

A positive electrode tab 9 is connected to the positive electrode current collector 3, a negative electrode tab 8 is connected to the negative electrode current collector 4, and these tabs are extracted outside the container. An ion conductor is injected and sealed in the container. It is also possible to form a structure in which an electrode group obtained by laminating a plurality of electrode elements is stored in the container.

Next, a relationship of the charge and discharge characteristics between the positive electrode 11 and the negative electrode 12 of the secondary battery 10 according to the present embodiment will be described.

First, in the secondary battery 10 according to the present embodiment, as shown in FIG. 2(a), in the initial stage of using the secondary battery 10, the potential of the positive electrode 11 tends to increase and the potential of the negative electrode 12 tends to decrease immediately before the completion of full charging.

In addition, the secondary battery 10 according to the present embodiment, as shown in FIG. 2(a), has a characteristic that the potential increase rate of the positive electrode 11 immediately before the completion of full charging is smaller than the potential decrease rate of the negative electrode 12 immediately before the completion of full charging in the initial stage of using the secondary battery 10. That is, the secondary battery 10 according to the present embodiment is, as shown in FIG. 2(a), used under a condition of the potential increase rate of the positive electrode 11 immediately before the completion of full charging being smaller than the potential decrease rate of the negative electrode 12 immediately before the completion of full charging in the initial stage of using the secondary battery 10.

In addition, the secondary battery 10 according to the present embodiment is constituted so that, in the initial stage of using the secondary battery 10, the absolute value of the potential increase rate per capacity or per time of the positive electrode 11 immediately before the completion of full charging becomes smaller than the potential decrease rate of the negative electrode 12 immediately before the completion of full charging.

That is, in the initial stage of using the secondary battery 10, the end of charging is mainly determined by a decrease in the potential of the negative electrode 12.

In addition, in the secondary battery 10 according to the present embodiment, as shown in FIG. 2(a), in the initial stage of using the secondary battery 10, the potential of the positive electrode 11 tends to decrease and the potential of the negative electrode 12 tends to increase immediately before the completion of full discharging.

In addition, the secondary battery 10 according to the present embodiment, as shown in FIG. 2(a), has a characteristic that the potential decrease rate of the positive electrode 11 immediately before the completion of full discharging is smaller than the potential increase rate of the negative electrode 12 immediately before the completion of full discharging in the initial stage of using the secondary battery 10.

That is, the initial stage of using the secondary battery 10 according to the present embodiment is, as shown in FIG. 2(a), used under a condition of the potential decrease rate of the positive electrode 11 immediately before the completion of full discharging being smaller than the potential increase rate of the negative electrode 12 immediately before the completion of full discharging.

In addition, the secondary battery 10 according to the present embodiment is constituted so that, in the initial stage of using the secondary battery 10, the absolute value of the potential decrease rate per capacity or per time of the positive electrode 11 immediately before the completion of full discharging becomes smaller than the potential increase rate of the negative electrode 12 immediately before the completion of full discharging.

That is, in the initial stage of using the secondary battery 10, the end of discharging is mainly determined by an increase in the potential of the negative electrode 12.

In addition, in the secondary battery 10 according to the present embodiment, in the initial stage of using the secondary battery, when discharging is carried out with a constant current of 1/20 C, a ratio ($\Delta V_2/\Delta V_1$) of an absolute value ($\Delta V_2$) of an amount of the potential changed per 10 mAh/g of the positive electrode 11 immediately before the completion of full discharging to an absolute value ($\Delta V_1$) of an amount of the potential changed per 10 mAh/g of the negative electrode 12 immediately before the completion of full discharging is preferably set so as to satisfy a relationship $\Delta V_2/\Delta V_1 \leq 1$ and more preferably set so as to satisfy a relationship $\Delta V_2/\Delta V_1 \leq 0.5$. That is, the secondary battery 10 according to the present embodiment is preferably used under a condition of, in the initial stage of using the secondary battery, when discharging is carried out with a constant current of 1/20 C, the ratio ($\Delta V_2/\Delta V_1$) of the absolute value ($\Delta V_2$) of the amount of the potential changed per 10 mAh/g of the positive electrode 11 immediately before the completion of full discharging to the absolute value ($\Delta V_1$) of the amount of the potential changed per 10 mAh/g of the negative electrode 12 immediately before the completion of full discharging satisfying the relationship $\Delta V_2/\Delta V_1 \leq 1$ and more preferably used under a condition of the ratio satisfying the relationship $\Delta V_2/\Delta V_1 \leq 0.5$.

In addition, the secondary battery 10 according to the present embodiment is designed so that, in the initial stage of using the secondary battery, when charging is carried out with a constant current of 1/20 C, a ratio ($\Delta V_4/\Delta V_3$) of an absolute value ($\Delta V_4$) of an amount of the potential changed per 10 mAh/g of the positive electrode 11 immediately before the completion of full charging to an absolute value ($\Delta V_3$) of an amount of the potential changed per 10 mAh/g of the negative electrode 12 immediately before the completion of full charging preferably satisfies a relationship $\Delta V_4/\Delta V_3 \leq 1$ and more preferably satisfies a relationship $\Delta V_4/\Delta V_3 < 0.5$. That is, the secondary battery 10 according to the present embodiment is preferably used under a condition of, in the initial stage of using the secondary battery, when charging is carried out with a constant current of 1/20 C, the ratio ($\Delta V_4/\Delta V_3$) of the absolute value ($\Delta V_4$) of the amount of the potential changed per 10 mAh/g of the positive electrode 11 immediately before the completion of full charging to the absolute value ($\Delta V_3$) of the amount of the potential changed per 10 mAh/g of the negative electrode 12 immediately before the completion of full charging satisfying the relationship $\Delta V_4/\Delta V_3 \leq 1$ and more preferably used under a condition of the ratio satisfying the relationship $\Delta V_4/\Delta V_3 < 0.5$.

In addition, the secondary battery 10 according to the present embodiment is preferably continuously used until a state in which, when charging is carried out with a constant current of 1/20 C, the ratio ($\Delta V_4/\Delta V_3$) of the absolute value ($\Delta V_4$) of the amount of the potential changed per 10 mAh/g of the positive electrode immediately before the completion of full charging to the absolute value ($\Delta V_3$) of the amount of the potential changed per 10 mAh/g of the negative electrode immediately before the completion of full charging satisfies a relationship $\Delta V_4/\Delta V_3 > 1$ and more preferably continuously used until a state in which the ratio satisfies a relationship $\Delta V_4/\Delta V_3 > 2$.

According to the secondary battery 10 according to the present embodiment, the charge and discharge characteristics of the positive electrode 11 and the negative electrode 12 satisfy the relationships shown in FIG. 2(a) in the initial stage of using the secondary battery, and thus, in the initial stage of using the secondary battery 10, it is possible to make excess conduction ions present in the positive electrode 11 at the time of completing full charging. In such a case, the secondary battery 10 according to the present embodiment can be operated using some of the capacity of the positive electrode 11 and the entire capacity of the negative electrode 12.

Therefore, it is possible to suppress the capacity of the secondary battery 10 being decreased even when the capacity of the positive electrode 11 decreases. In addition, in the period of time of the secondary battery 10 being used, when some of the conduction ions that contribute to charging and discharging decrease due to the absorption into the reaction product by the decomposition of the electrolytic solution or the like, the available portion in the capacity of the positive electrode 11 shifts, whereby it is possible to compensate for the decreased conduction ions using the excess conduction ions in the positive electrode 11. Therefore, it is possible to suppress the capacity of the secondary battery 10 being decreased even when some of the conduction ions that contribute to charging and discharging decrease.

In addition, the secondary battery 10 according to the present embodiment is capable of operating as a battery even when used until a state in which the potential increase rate of the positive electrode 11 immediately before the completion of full charging becomes larger than the potential decrease rate of the negative electrode 12 immediately before the completion of full charging as shown in FIG. 2(b). Therefore, the secondary battery 10 according to the present embodiment is preferably continuously used until a state in which the potential increase rate of the positive electrode 11 immediately before the completion of full charging becomes larger than the potential decrease rate of the negative electrode 12 immediately before the completion of full charging. In such a case, according to the secondary battery 10 according to the present embodiment, it is possible to further extend the product service life.

As a method for realizing a secondary battery in which the charge and discharge characteristics of the positive electrode 11 and the negative electrode 12 satisfy the relationships shown in FIG. 2(a) and FIG. 2(b), for example, a method in which the positive electrode 11 on which a treatment that removes some of the conduction ions in the positive electrode 11 has been carried out is used, a method in which the negative electrode 12 including a material having an irreversible capacity is used, a method in which the negative electrode 12 to which conduction ions have been added is used, a method in which the positive electrode 11 to which conduction ions have been added is used, a method in which the positive electrode 11 on which a chemical treatment that removes or adds some of the conduction ions in the positive electrode 11 has been carried out is used, and the like are exemplified.

Examples of the material having an irreversible capacity include polyimides, silicon, and the like. In addition, as the treatment that adds conduction ions to the positive electrode 11, over discharging treatment and the like are exemplified.

As the method for realizing a secondary battery in which the charge and discharge characteristics of the positive electrode 11 and the negative electrode 12 satisfy the relationships shown in FIG. 2(a) and FIG. 2(b), more specifically, the following methods 1 to 4 are exemplified.

(Method 1) A method in which a positive electrode having a larger irreversible capacity than a negative electrode on which a treatment that removes some of conduction ions (for example, a chemical treatment) has been carried out is used (refer to Example 1 described below)

(Method 2) A method in which a negative electrode including a negative electrode active material having an irreversible capacity that is smaller than the irreversible capacity of a positive electrode and a material having an irreversible capacity (for example, a polyimide or silicon) is used (refer to Example 2 described below)

(Method 3) A method in which a negative electrode having a larger irreversible capacity than a positive electrode on which a treatment that adds conduction ions (for example, a chemical treatment) has been carried out is used (refer to Example 3 described below)

(Method 4) A method in which a positive electrode having a smaller irreversible capacity than a negative electrode on which a treatment that adds conduction ions (for example, a chemical treatment or an over discharging treatment) has been carried out is used (refer to Example 4 described below)

It is possible to produce an assembled battery by combining a plurality of the secondary batteries 10 according to the present embodiment. The secondary batteries 10 according to the present embodiment or an assembled battery thereof can be preferably used in the use of storage systems, automobile batteries, and the like.

In addition, the secondary battery 10 according to the present embodiment is, for example, a lithium ion secondary battery.

Next, the respective components constituting the secondary battery 10 according to the present embodiment will be described.

(Positive Electrode)

The positive electrode 11 that constitutes the secondary battery 10 according to the present embodiment has, for example, the positive electrode current collector 3 constituted of a metal foil such as an aluminum foil and the positive electrode active material layer 1 containing a positive electrode active material that is provided on one surface of the positive electrode current collector 3.

The positive electrode active material is not particularly limited as long as the positive electrode active material includes a material capable of storing and discharging lithium. For example, it is possible to use 4 V-class (average operating potential=3.6 to 3.8 V; counter lithium potential) materials such as $LiMn_2O_4$, $LiCoO_2$, and the like. In these positive electrode active materials, the development potential is regulated by a redox reaction of a Co ion or a Mn ion ($Co^{3+} \leftrightarrow Co^{4-}$ or $Mn^{3-} \leftrightarrow Mn^{4+}$).

In addition, as the positive electrode active material, it is also possible to use lithium-containing complex oxides such as $LiM1O_2$ (M1 represents at least one element selected from the group consisting of Mn, Fe, Co, and Ni, and some of M1's may be substituted by Mg, Al, or Ti), $LiMn_{2-x}M2_xO_4$ (M2 represents at least one element selected from the group consisting of Mg, Al, Co, Ni, Fe, and B, and $0 \le x < 0.4$), and the like; olivine-type materials represented by $LiFePO_4$; and the like.

In addition, from the viewpoint of obtaining a high energy density, a positive electrode active material capable of storing and discharging lithium ions at a potential of equal to or higher than 4.5 V with respect to lithium metal is preferably included.

The positive electrode active material having a potential that is equal to or higher than 4.5 V with respect to lithium metal can be selected using a method as described below. First, a positive electrode including a positive electrode active material and Li metal are disposed in a container in a state of facing each other across a separator, and then an electrolytic solution is poured into the container, thereby producing a battery. In addition, a positive electrode active material having a charge and discharge capacity of equal to or more than 10 mAh/g per mass of the positive electrode active material at a potential that is equal to or higher than 4.5 V with respect to lithium metal in the case of carrying out charging and discharging at a constant current that reaches, for example, 5 mAh/g per mass of the positive electrode active material in a positive electrode can be used as the positive electrode active material that operates at a potential of equal to or higher than 4.5 V with respect to lithium metal.

For example, it is known that a 5 V-class operating potential can be realized using a spinel compound obtained by substituting Mn in lithium manganite with Ni, Co, Fe, Cu, Cr, or the like as the positive electrode active material. Specifically, it is known that a spinel compound such as $LiNi_{0.5}Mn_{1.5}O_4$ exhibits a potential flat in a range of equal to or higher than 4.5 V. In the above-described spinel compound, Mn is present in a tetravalent state, and the operating potential is regulated by the redox of $Ni^{2+} \leftrightarrow Ni^{4+}$ instead of the redox of $Mn^{3-} \leftrightarrow Mn^{4+}$.

For example, $LiNi_{0.5}Mn_{1.5}O_4$ has a capacity of equal to or more than 130 mAh/g and an average operating voltage of equal to or higher than 4.6 V with respect to lithium metal. The capacity is smaller than that of $LiCoO_2$, but the energy density of a battery is higher than that of $LiCoO_2$. Furthermore, spinel-type lithium manganese oxides have a three-dimensional lithium diffusion path and also have advantages of excellent thermodynamic stability and easiness of synthesis.

As the positive electrode active material that operates at a potential of equal to or higher than 4.5 V with respect to lithium metal, for example, there is a lithium manganese complex oxide represented by Formula (1). The lithium manganese complex oxide represented by Formula (1) is a positive electrode active material that operates at a potential of equal to or higher than 4.5 V with respect to lithium metal.

$$Li_a(M_xMn_{2-x-y}Y_y)(O_{4-w}Z_w) \qquad (1)$$

(In the formula, $0.3 \le x \le 1.2$, $1 \le y$, $x+y<2$, $0 \le a \le 1.2$, and M represents at least one selected from the group consisting of Co, Ni, Fe, Cr, and Cu. Y represents at least one selected from the group consisting of Li, B, Na, Al, Mg, Ti, Si, K, and Ca. Z is at least one selected from the group consisting of F and Cl.)

In addition, the lithium manganese complex oxide represented by Formula (1) is more preferably a compound represented by Formula (1-1).

$$Li_a(M_xMn_{2-x-y}Y_y)(O_{4-w}Z_w) \qquad (1\text{-}1)$$

(In the formula, $0.5 \le x \le 1.2$, $0 \le y$, $x+y<2$, $0 \le a \le 1.2$, and M represents at least one selected from the group consisting of Co, Ni, Fe, Cr, and Cu. Y represents at least one selected from the group consisting of Li, B, Na, Al, Mg, Ti, Si, K, and Ca. Z is at least one selected from the group consisting of F and Cl.)

In addition, in Formula (1), Ni is preferably included as M, and M is more preferably only Ni. This is because, in the case of including Ni as M, it is possible to relatively easily obtain positive electrode active materials having a high capacity. In a case in which M is only Ni, from the viewpoint of obtaining positive electrode active materials having a high capacity, x is preferably equal to or more than 0.4 and equal to or less than 0.6. In addition, when the positive electrode active material is $LiNi_{0.5}Mn_{1.5}O_4$, a high capacity of equal to or more than 130 mAh/g can be obtained, which is more preferable.

In addition, as the positive electrode active material that operates at a potential of equal to or higher than 4.5 V with respect to lithium metal, which is represented by Formula (1), for example, $LiCrMnO_4$, $LiFeMnO_4$, $LiCoMnO_4$, $LiCu_{0.5}Mn_{1.5}O_4$, and the like are exemplified. These positive electrode active materials have a high capacity. In addition, the positive electrode active material may have a composition obtained by mixing the above-described active material and $LiNi_{0.5}Mn_{1.5}O_4$.

In addition, there is a case where it becomes possible to improve service lives by substituting some of Mn portions in these active materials with Li, B, Na, Al, Mg, Ti, SiK, Ca, or the like. That is, in Formula (1), there is a case where service lives can be improved in the case of $0<y$. Among these, in a case where Y is Al, Mg, Ti, or Si, the service life improvement effect is strong. In addition, in a case where Y is Ti, the service life improvement effect is exhibited while maintaining a high capacity, which is more preferable. The range of y is preferably more than 0 and equal to or less than 0.3. When y is set to be equal to or less than 0.3, it becomes easy to suppress a decrease in the capacity.

In addition, it is possible to substitute oxygen portions with F or Cl. In Formula (1), when w is set to be more than 0 and equal to or less than 1, it is possible to suppress a decrease in the capacity.

As examples of the spinel-type positive electrode active material represented by Formula (1), for example, compounds including Ni as M such as $LiNi_{0.5}Mn_{1.5}O_4$; $LiCr_xMn_{2-x}O_4$ ($0.4 \le x \le 1.1$), $LiFe_xMn_{2-x}O_4$ ($0.4 \le x \le 1.1$), $LiCu_xMn_{2-x}O_4$ (0.3≤x≤0.6), $LiCo_xMn_{2-x}O_4$ (0.4≤x≤1.1), and the like; and solid solutions thereof.

In addition, as the positive electrode active material that operates at a potential of equal to or higher than 4.5 V with respect to lithium metal, olivine-type positive electrode active materials are exemplified. As the olivine-type positive electrode active materials, $LiMPO_4$ (M: at least one of Co and Ni), for example, $LiCoPO_4$, $LiNiPO_4$, or the like is exemplified.

In addition, as the positive electrode active material that operates at a potential of equal to or higher than 4.5 V with respect to lithium metal, Si complex oxides are exemplified, and examples of the Si complex oxides include $Li_2MSiO_4$ (M: at least one of Mn, Fe, and Co).

In addition, as the positive electrode active material that operates at a potential of equal to or higher than 4.5 V with respect to lithium metal, positive electrode active materials having a lamellar structure are also exemplified, and examples thereof include positive electrode active materials represented by Li $(M1_xM2_yMn_{2-x-y}) O_2$ (M1: at least one selected from the group consisting of Ni, Co, and Fe, M2: at least one selected from Li, Mg, and Al, 0.1<x<0.5, and 0.05<y<0.3), $Li(M_{1-z}Mn_z)O_2$ (M: at least one selected from the group consisting of Li, Co, and Ni and 0.7≥z≥0.33), Li $(Li_xM_{2-x-z}Mn_z) O_2$ (M: at least one of Co and Ni, 0.3>x≥0.1, and 0.7≥z≥0.33), or the like.

A specific surface area of the positive electrode active material such as the lithium manganese complex oxide represented by Formula (1) or the like is, for example, 0.01 to 5 $m^2/g$, preferably 0.05 to 4 $m^2/g$, more preferably 0.1 to 3 $m^2/g$, and still more preferably 0.2 to 2 $m^2/g$. When the specific surface area is set to the above-described range, it is possible to adjust a contact area with the electrolytic solution to an appropriate range. That is, when the specific surface area is set to be equal to or more than the above-described lower limit value, it becomes easy to smoothly insert and desorb lithium ions, and the resistance can be further decreased. In addition, when the specific surface area is set to be equal to or less than the above-described upper limit value, it is possible to suppress the decomposition of the electrolytic solution being accelerated or the elution of the constituent elements of the active material.

A central particle diameter (median diameter: $D_{50}$) of the active material such as the lithium manganese complex oxide or the like is preferably 0.1 to 50 μm and more preferably 0.2 to 40 μm. When the particle diameter is set to be equal to or more than the above-described lower limit value, it is possible to further suppress the elution of the constituent elements such as Mn and the like and further suppress the deterioration caused by the contact with the electrolytic solution. In addition, when the particle diameter is set to be equal to or less than the above-described upper limit value, it becomes easy to smoothly insert and desorb lithium ions, and the resistance can be further decreased.

The particle diameter can be measured using a laser diffraction and scattering-type particle size distribution measurement instrument.

The positive electrode active material can be used singly or two or more positive electrode active materials can be jointly used.

For example, only the above-described 4 V-class positive electrode active material may be included. In addition, from the viewpoint of obtaining a high energy density, it is more preferable to use the positive electrode active material that operates at a potential of equal to or higher than 4.5 V with respect to lithium metal as described above. The 4 V-class positive electrode active material may be further included.

A binding agent for the positive electrode is not particularly limited, and examples thereof include polyvinylidene fluoride (PVDF), vinylidene fluoride-hexafluoropropylene copolymers, vinylidene fluoride-tetrafluoroethylene copolymers, styrene-butadiene copolymerized rubber, polytetrafluoroethylene, polypropylene, polyethylene, polyimide, polyamide-imide, and the like. Among these, polyvinylidene fluoride is preferred from the viewpoint of versatility or a low cost.

The amount of the binding agent for the positive electrode being used is preferably 2 to 10 parts by mass with respect to 100 parts by mass of the positive electrode active material from the viewpoint of "a sufficient binding force" and "an increase in energy" that are in a trade-off relationship.

To the positive electrode active material layer 1 including the positive electrode active material, a conductive auxiliary agent may be added for the purpose of decreasing the impedance. Examples of the conductive auxiliary agent include fine carbonaceous particles such as graphite, carbon black, acetylene black, and the like.

The positive electrode current collector 3 is not particularly limited; however, from the viewpoint of electrochemical stability, a current collector constituted of one or more selected from aluminum, nickel, copper, silver, alloys thereof, and stainless steel is preferred. As a shape of the positive electrode current collector 3, for example, a foil, a flat plate shape, a mesh shape, and the like are exemplified.

The positive electrode 11 can be produced by, for example, forming the positive electrode active material layer 1 including the positive electrode active material and the binding agent for the positive electrode on the positive electrode current collector 3. As a method for forming the positive electrode active material layer 1, for example, a doctor blade method, a die coater method, a CVD method, a sputtering method, and the like are exemplified. The positive electrode current collector 3 may also be produced by forming the positive electrode active material layer 1 in advance and then forming a thin film of aluminum, nickel, or an alloy thereof using a method such as deposition, sputtering, or the like.

(Negative Electrode)

The negative electrode 12 that constitutes the secondary battery 10 according to the present embodiment has, for example, the negative electrode current collector 4 constituted of a metal foil such as a copper foil and the negative electrode active material layer 2 containing a negative electrode active material that is provided on one surface of the negative electrode current collector 4.

The negative electrode active material is not particularly limited as long as the negative electrode active material includes a material capable of storing and discharging lithium, and examples thereof include (a) carbon materials capable of storing and discharging lithium ions, (b) metal capable of storing and discharging lithium, (c) metal oxides capable of storing and discharging lithium ions, and the like.

As the carbon materials (a), it is possible to use graphite (natural graphite, artificial graphite, and the like), amorphous carbon, diamond-like carbon, carbon nanotubes, complexes thereof, and the like.

Here, highly crystalline graphite has a high electric conduction property and is excellent in terms of adhesiveness to the negative electrode current collector 4 made of metal such as copper and voltage flatness. On the other hand, poorly crystalline amorphous carbon has a volume that expands to a relatively small extent and thus has a strong effect for alleviating the volume expansion of the entire negative electrode and does not easily deteriorate due to non-uniformity such as crystal grain boundaries or defects.

The carbon material (a) can be used singly or can be jointly used with other substance. In an embodiment in which the carbon material is jointly used with other substance, the content of the carbon material (a) is preferably in a range of equal to or more than 2% by mass and equal to or less than 80% by mass and more preferably in a range of equal to or more than 2% by mass and equal to or less than 30% by mass of the negative electrode active material.

As the metal (b), it is possible to use, for example, metal containing, as a main body, Al, Si, Pb, Sn, Zn, Cd, Sb, In, Bi, Ag, Ba, Ca, Hg, Pd, Pt, Te, La, or the like; alloys of two or more of these metals; alloys of these metals or alloys and lithium; and the like. As the metal (b), silicon (Si) is more preferably included.

The metal (b) can be used singly or can be jointly used with other substance. In an embodiment in which the metal is jointly used with other substance, the content of the metal (b) is preferably in a range of equal to or more than 5% by mass and equal to or less than 90% by mass and more preferably in a range of equal to or more than 20% by mass and equal to or less than 50% by mass of the negative electrode active material.

As the metal oxides (c), it is possible to use, for example, silicon oxide, aluminum oxide, tin oxide, indium oxide, zinc oxide, lithium oxide, complexes thereof, and the like. As the metal oxide (c), silicon oxide is more preferably included. This is because silicon oxide is relatively stable and does not easily cause a reaction with other compounds.

In addition, it is also possible to add, for example, 0.1% to 5% by mass of one or more elements selected from nitrogen, boron, and sulfur to the metal oxide (c). In such a case, the electric conduction property of the metal oxide (c) can be improved.

The metal oxide (c) can be used singly or can be jointly used with other substance. In an embodiment in which the metal oxide is jointly used with other substance, the content of the metal oxide (c) is preferably in a range of equal to or more than 5% by mass and equal to or less than 90% by mass and more preferably in a range of equal to or more than 40% by mass and equal to or less than 70% by mass of the negative electrode active material.

Examples of the metal oxide (c) include $LiFe_2O_3$, $WO_2$, $MoO_2$, SiO, $SiO_2$, CuO, SnO, $SnO_2$, $Nb_3O_5$, $Li_xTi_{2-x}O_4$ ($1 \leq x \leq 4/3$), $PbO_2$, $Pb_2O_5$, and the like.

In addition, as the negative electrode active material, in addition to the above-described materials, for example, (d) metal sulfides capable of storing and discharging lithium ions are exemplified. Examples of the metal sulfides (d) include SnS, $FeS_2$, and the like.

In addition, as the negative electrode active material, in addition to the above-described materials, for example, metallic lithium; lithium alloys; polyacene; polythiophene; lithium nitrides such as $Li_5(Li_3N)$, $Li_7MnN_4$, $Li_3FeN_2$, $Li_{2.5}Co_{0.5}N$, $Li_3CoN$, and the like; and the like can be exemplified.

The above-described negative electrode active materials can be used singly or two or more negative electrode active materials can be used in a mixture form.

In addition, the negative electrode active material can be constituted to include the carbon material (a), the metal (b), and the metal oxide (c). Hereinafter, this negative electrode active material will be described.

The metal oxide (c) preferably has an amorphous structure wholly or partially. The metal oxide (c) having an amorphous structure is capable of suppressing the volume expansion of the carbon material (a) or the metal (b) and is capable of suppressing the decomposition of the electrolytic solution. Regarding this mechanism, it is assumed that the metal oxide (c) has an amorphous structure, which affects the formation of coatings in the interface between the carbon material (a) and the electrolytic solution by some means. In addition, in amorphous structures, it is considered that there are a relatively small number of elements caused by non-uniformity such as crystal grain boundaries or defects. Meanwhile, the fact that the metal oxide (c) has an amorphous structure wholly or partially can be confirmed by an X-ray diffraction measurement (ordinary XRD measurement). Specifically, in a case where the metal oxide (c) does not have an amorphous structure, an intrinsic peak of the metal oxide (c) is observed; however, in a case where the metal oxide (c) has an amorphous structure wholly or partially, the broadened intrinsic peak of the metal oxide (c) is observed.

The metal oxide (c) is preferably an oxide of the metal that constitutes the metal (b). In addition, the metal (b) and the metal oxide (c) are respectively preferably silicon (Si) and silicon oxide (SiO).

All or part of the metal (b) is preferably dispersed in the metal oxide (c). When at least part of the metal (b) is dispersed in the metal oxide (c), it is possible to further suppress the volume expansion of the entire negative electrode and also suppress the decomposition of the electrolytic solution. Meanwhile, the fact that all or part of the metal (b) is dispersed in the metal oxide (c) can be confirmed by jointly using a transmission electron microscopic observation (ordinary transmission electron microscopic (TEM) observation) and an energy dispersive X-ray spectrometric (EDX) measurement (ordinary energy dispersive X-ray spectroscopic measurement). Specifically, a cross section of a sample including the particles of the metal (b) is observed, the oxygen concentration of the particles of the metal (b) dispersed in the metal oxide (c) is measured, and the metal that constitutes the particles of the metal (b) not turning into an oxide can be confirmed.

As described above, the respective content rates of the carbon material (a), the metal (b), and the metal oxide (c) with respect to the total of the carbon material (a), the metal (b), and the metal oxide (c) are preferably equal to or more than 2% by mass and equal to or less than 80% by mass, equal to or more than 5% by mass and equal to or less than 90% by mass, and equal to or more than 5% by mass and equal to or less than 90% by mass, respectively. In addition, the respective content rates of the carbon material (a), the metal (b), and the metal oxide (c) with respect to the total of the carbon material (a), the metal (b), and the metal oxide (c) are more preferably equal to or more than 2% by mass and equal to or less than 30% by mass, equal to or more than 20% by mass and equal to or less than 50% by mass, and equal to or more than 40% by mass and equal to or less than 70% by mass, respectively.

A negative electrode active material in which the metal oxide (c) has an amorphous structure wholly or partially and all or part of the metal (b) is dispersed in the metal oxide (c) can be produced using, for example, a method as disclosed by Japanese Laid-open Patent Publication No. 2004-47404. That is, a CVD treatment is carried out on the metal oxide (c) in an atmosphere including an organic substance gas such as methane gas, whereby it is possible to turn the metal (b) in the metal oxide (c) into nanoclusters and obtain a complex having a surface coated with the carbon material (a). In addition, the negative electrode active material can also be produced by mixing the carbon material (a), the metal (b), and the metal oxide (c) by mechanical mixing.

In addition, the carbon material (a), the metal (b), and the metal oxide (c) are not particularly limited, and it is possible to use a particulate carbon material, a particulate metal, and a particulate metal oxide respectively. For example, the metal (b) can be constituted to have an average particle diameter that is smaller than the average particle diameter of the carbon material (a) and the average particle diameter of the metal oxide (c). In such a case, the metal (b) having a volume that is significantly changed due to charging and discharging has a relatively small particle diameter, and the carbon material (a) or the metal oxide (c) having a volume that is slightly changed has a relatively large particle diameter, and thus the generation of dendrites and the pulverization of alloys can be more effectively suppressed.

In addition, in a process of charging and discharging, lithium is sequentially stored in and discharged from particles having a large particle diameter, particles having a small particle diameter, and particles having a large particle diameter, which also suppress the generation of residual stress or residual strain. The average particle diameter of the metal (b) can be set to, for example, equal to or less than 20 μm and is preferably set to equal to or less than 15 μm.

In addition, the average particle diameter of the metal oxide (c) is preferably equal to or less than ½ of the average particle diameter of the carbon material (a), and the average particle diameter of the metal (b) is preferably equal to or less than ½ of the average particle diameter of the metal oxide (c). Furthermore, it is more preferable that the average particle diameter of the metal oxide (c) is equal to or less than ½ of the average particle diameter of the carbon material (a) and the average particle diameter of the metal (b) is equal to or less than ½ of the average particle diameter of the metal oxide (c). When the average particle diameters are controlled to be in the above-described ranges, it is possible to more effectively obtain an effect for alleviating the volume expansion of metal and alloy phases and obtain secondary batteries being excellent in terms of the balance among the energy density, the cycle service life, and the efficiency. More specifically, it is preferable to set the average particle diameter of silicon oxide (c) to be equal to or less than ½ of the average particle diameter of graphite (a) and set the average particle diameter of silicon (b) to be equal to or less than ½ of the average particle diameter of silicon oxide (c). In addition, more specifically, the average particle diameter of silicon (b) can be set to be equal to or less than 20 μm and is preferably set to equal to or less than 15 μm.

In addition, as the negative electrode active material, it is possible to use graphite having a surface coated with a poorly crystalline carbon material. When the surface of graphite is coated with a poorly crystalline carbon material, it is possible to suppress a reaction between the negative electrode active material and the electrolytic solution even in the case of using highly conductive carbon as the negative electrode active material. Therefore, when the graphite coated with a poorly crystalline carbon material is used as the negative electrode active material, it is possible to improve the capacity retention of batteries and improve battery capacities.

For the poorly crystalline carbon material that coats the surface of graphite, a ratio $I_D/I_G$ of a peak intensity $I_D$ of a D peak that is generated in a range of 1,300 cm$^{-1}$ to 1,400 cm$^{-1}$ to a peak intensity $I_G$ of a G peak that is generated in a range of 1,550 cm$^{-1}$ to 1,650 cm$^{-1}$ in a Raman spectrum obtained by a laser Raman analysis is preferably equal to or more than 0.08 and equal to or less than 0.5.

Generally, highly crystalline carbon materials exhibit a low $I_D/I_G$, and poorly crystalline carbon materials exhibit a high $I_D/I_G$. When $I_D/I_G$ is equal to or more than 0.08, even in a case where the negative electrode active material is operated at a high voltage, it is possible to suppress the reaction between the graphite and the electrolytic solution and improve the capacity retention of batteries. When $I_D/I_G$ is equal to or less than 0.5, it is possible to improve battery capacities. In addition, $I_D/I_G$ is more preferably equal to or more than 0.1 and equal to or less than 0.4.

For the laser Raman analysis of the poorly crystalline carbon material, it is possible to use, for example, an argon ion laser Raman analyzer. In the case of materials that absorb a large amount of a laser such as carbon materials, the laser is absorbed into up to several tens of nanometers from the surface. Therefore, information of the poorly crystalline carbon material disposed on the surface can be substantially obtained by carrying out a laser Raman analysis on the graphite having a surface coated with the poorly crystalline carbon material.

The $I_D$ value or the $I_G$ value can be obtained from, for example, a laser Raman spectrum measured under the following conditions.

Laser Raman spectrometer: Ramanor T-64000 (manufactured by Jobin Yvon/Atago Bussan Co., Ltd.)
Measurement mode: Macro Roman
Measurement disposition: 60°
Beam diameter: 100
Light source: Ar+ laser/514.5 nm
Laser power: 10 mW
Diffraction grid: Single600 gr/mm
Dispersion: Single21 A/mm
Slit: 100 μm
Detector: CCD/Jobin Yvon1024256

The graphite coated with the poorly crystalline carbon material can be obtained by, for example, coating particulate graphite with a poorly crystalline carbon material. The average particle diameter (volume average: $D_{50}$) of graphite particles is preferably equal to or more than 5 μm and equal to or less than 30 μm. The graphite is preferably crystalline, and the $I_D/I_G$ value of the graphite is more preferably equal to or more than 0.01 and equal to or less than 0.08.

The thickness of the poorly crystalline material is preferably equal to or more than 0.01 μm and equal to or less than 5 μm and more preferably equal to or more than 0.02 μm and equal to or less than 1 μm.

The average particle diameter ($D_{50}$) can be measured using, for example, a laser diffraction and scattering particle size distribution measurement instrument MICROTRAC MT3300EX (manufactured by Nikkiso Co., Ltd.).

The poorly crystalline carbon material can be formed on the surface of the graphite using, for example, a gas-phase method in which hydrocarbon such as propane, acetylene, or the like is thermally decomposed, thereby depositing carbon. In addition, the poorly crystalline carbon material can be formed using, for example, a method in which pitch, talc, or the like is attached to the surface of the graphite and fired at 800° C. to 1,500° C.

For the graphite, a layer spacing $d_{002}$ of a 002 plane is preferably equal to or more than 0.33 nm and equal to or less than 0.34 nm, more preferably equal to or more than 0.333 nm and equal to or less than 0.337 nm, and still more preferably equal to or less than 0.336 nm in the crystal structure. Highly crystalline graphite as described above has a high lithium storage capacity and is capable of improving the charge and discharge efficiency.

The laser spacing of the graphite can be measured by, for example, X-ray diffraction.

A specific surface area of the graphite coated with the poorly crystalline carbon material is, for example, 0.01 to 20 $m^2/g$, preferably 0.05 to 10 $m^2/g$, more preferably 0.1 to 5 $m^2/g$, and still more preferably 0.2 to 3 $m^2/g$. When the specific surface area of the graphite coated with the poorly crystalline carbon material is set to be equal to or more than 0.01 $m^2/g$, it becomes easy to smoothly insert and desorb lithium ions, and the resistance can be further decreased. When the specific surface area of the graphite coated with the poorly crystalline carbon material is set to be equal to or less than 20 $m^2/g$, it is possible to further suppress the decomposition of the electrolytic solution and further suppress the elution of the constituent elements of the active material into the electrolyte solution.

The graphite that serves as a base material is preferably highly crystalline graphite, for example, artificial graphite or natural graphite can be used, but the graphite is not particularly limited thereto. As the poorly crystalline carbon material, for example, coal tar, pitch coke, or a phenolic resin is used, and a poorly crystalline carbon material mixed with highly crystalline carbon can be used. A mixture is prepared by mixing 5% to 50% by mass of the poorly crystalline carbon material into highly crystalline carbon. The mixture is heated at 150° C. to 300° C. and then, furthermore, thermally treated in a range of 600° C. to 1,500° C. Therefore, thermally-treated graphite having a surface coated with the poorly crystalline carbon can be obtained. The thermal treatment is preferably carried out in an atmosphere of an inert gas such as argon, helium, nitrogen, or the like.

The negative electrode active material may include, in addition to the graphite having a surface coated with the poorly crystalline carbon material, other active materials.

A binding agent for the negative electrode is not particularly limited, and examples thereof include polyvinylidene fluoride (PVdF), vinylidene fluoride-hexafluoropropylene copolymers, vinylidene fluoride-tetrafluoroethylene copolymers, styrene-butadiene copolymerized rubber, polytetrafluoroethylene, polypropylene, polyethylene, polyimide, polyamide-imide, and the like.

The content rate of the binding agent for the negative electrode is preferably in a range of 1% to 30% by mass and more preferably 2% to 25% by mass of the total amount of the negative electrode active material and the binding agent for the negative electrode. When the content rate is set to be equal to or more than the above-described lower limit value, the adhesiveness between the negative electrode active materials or between the negative electrode active material and the current collector improves, and the cycle characteristics become favorable. In addition, when the content rate is set to be equal to or less than the above-described upper limit value, the ratio of the negative electrode active material improves, and it is possible to improve the capacity of the negative electrode.

The negative electrode current collector 4 is not particularly limited; however, from the viewpoint of electrochemical stability, a current collector constituted of one or more selected from aluminum, nickel, copper, silver, alloys thereof, and stainless steel is preferred. As a shape of the negative electrode current collector 4, for example, a foil, a flat plate shape, a mesh shape, and the like are exemplified.

The negative electrode 12 can be produced by, for example, forming the negative electrode active material layer 2 including the negative electrode active material and the binding agent for the negative electrode on the negative electrode current collector 4. As a method for forming the negative electrode active material layer 2, for example, a doctor blade method, a die coater method, a CVD method, a sputtering method, and the like are exemplified. The negative electrode current collector 4 may also be produced by forming the negative electrode active material layer 2 in advance and then forming a thin film of aluminum, nickel, or an alloy thereof using a method such as deposition, sputtering, or the like.

(Separation Layer)

As the separation layer 5 that constitutes the secondary battery 10 according to the present embodiment, it is possible to use, for example, a separator. Examples of the separator include woven fabrics; non-woven fabrics; porous polymer films such as polyolefin-based films such as polyethylene, polypropylene, and the like, polyimide films, porous polyvinylidene fluoride films, and the like; ion conductive polymer-electrolyte films; and the like. These separators can be used singly or in combination.

In addition, in a case where a solid electrolyte is used as the ion conductor, the solid electrolyte can also be used as the separation layer 5.

(Ion Conductor)

As the ion conductor that constitutes the secondary battery 10 according to the present embodiment, for example, electrolytic solutions including a supporting electrolyte and a non-aqueous electrolytic solvent, solid electrolytes, and the like are exemplified.

The non-aqueous electrolytic solvent preferably includes a cyclic polycarbonate and/or a chain-like carbonate.

The cyclic polycarbonate or the chain-like carbonate has a large relative permittivity, and thus the addition of the carbonate improves the dissociation property of the supporting electrolyte and facilitates the imparting of a sufficient conduction property. In addition, the cyclic polycarbonate and the chain-like carbonate are favourable in terms of voltage resistance and conductivity and are thus suitable for the mixing with fluorine-containing esters of phosphoric acid. Furthermore, when a material having an effect for decreasing the viscosity of the electrolytic solution is selected, it is also possible to improve the ion mobility in the electrolytic solution.

The cyclic carbonate is not particularly limited, and, for example, ethylene carbonate (EC), propylene carbonate (PC), butylene carbonate (BC), vinylene carbonate (VC), and the like can be exemplified.

In addition, the cyclic carbonate includes a fluorinated cyclic carbonate. As the fluorinated cyclic carbonate, it is possible to exemplify, for example, compounds obtained by substituting part or all of hydrogen atoms in ethylene carbonate (EC), propylene carbonate (PC), butylene carbonate (BC), vinylene carbonate (VC), or the like with fluorine atoms and the like.

As the fluorinated cyclic carbonate, more specifically, it is possible to use 4-fluoro-1,3-dioxolan-2-one, (cis or trans) 4,5-difluoro-1,3-dioxolane-2-one, 4,4-difluoro-1,3-dioxolan-2-one, 4-fluoro-5-methyl-1,3-dioxolan-2-one, and the like.

Among these, the cyclic carbonate is preferably ethylene carbonate, propylene carbonate, a compound obtained by partially fluorinating ethylene carbonate or propylene carbonate, or the like and more preferably ethylene carbonate from the viewpoint of voltage resistance or conductivity. The cyclic carbonate can be used singly or two or more cyclic carbonates can be jointly used.

The content rate of the cyclic carbonate in the non-aqueous electrolytic solvent is preferably equal to or more than 0.1% by volume, more preferably equal to or more than 5% by volume, still more preferably equal to or more than 10% by volume, and particularly preferably equal to or more than 15% by volume from the viewpoint of an effect for increasing the degree of dissociation of the supporting electrolyte and an effect for increasing the conductivity of the electrolytic solution. In addition, the content rate of the cyclic carbonate in the non-aqueous electrolytic solvent is preferably equal to or less than 70% by volume, more preferably equal to or less than 50% by volume, and still more preferably equal to or less than 40% by volume from the viewpoint of an effect for increasing the degree of dissociation of the supporting electrolyte and an effect for increasing the conductivity of the electrolytic solution.

The chain-like carbonate is not particularly limited, and, for example, dimethyl carbonate (DMC), ethyl methyl carbonate (EMC), diethyl carbonate (DEC), dipropyl carbonate (DPC), and the like can be exemplified.

In addition, the chain-like carbonate includes a fluorinated chain-like carbonate. As the fluorinated chain-like carbonate, it is possible to exemplify, for example, compounds having a structure obtained by substituting part or all of hydrogen atoms in ethyl methyl carbonate (EMC), dimethyl carbonate (DMC), diethyl carbonate (DEC), dipropyl carbonate (DPC), or the like with fluorine atoms and the like.

As the fluorinated chain-like carbonate, more specifically, bis(fluoroethyl) carbonate, 3-fluoropropylmethyl carbonate, 3,3,3-trifluoropropylmethyl carbonate, 2,2,2-trifluoroethyl methyl carbonate, 2,2,2-trifluoroethyl ethyl carbonate, monofluoromethyl methyl carbonate, methyl 2,2,3,3 tetrafluoropropyl carbonate, ethyl 2,2,3,3 tetrafluoropropyl carbonate, bis(2,2,3,3, tetrafluoropropyl) carbonate, bis(2,2,2 trifluoroethyl) carbonate, 1-monofluoroethyl ethyl carbonate, 1-monofluoroethyl methyl carbonate, 2-monofluoroethyl methyl carbonate, bis(1-monofluoroethyl) carbonate, bis(2-monofluoroethyl) carbonate, bis(monofluoromethyl) carbonate, and the like are exemplified.

Among these, dimethyl carbonate, 2,2,2-trifluoroethyl methyl carbonate, monofluoromethyl methyl carbonate, methyl 2,2,3,3, tetrafluoropropyl carbonate, and the like are preferred from the viewpoint of voltage resistance and conductivity. The chain-like carbonate can be used singly or two or more chain-like carbonates can be jointly used.

The chain-like carbonate has an advantage that, in a case where the number of carbon atoms in a substituent that is added to a "—OCOO—" structure is small, the viscosity is low. On the other hand, when the number of carbon atoms is large, the viscosity of the electrolytic solution increases, and there is a case where the conduction property of Li ions degrades. For the above-described reason, the total number of carbon atoms in two substituents that are added to the "—OCOO—" structure of the chain-like carbonate is preferably equal to or more than 2 and equal to or less than 6. In addition, in a case where the substituent that is added to the "—OCOO—" structure contains a fluorine atom, the oxidation resistance of the electrolytic solution improves. For the above-described reason, the chain-like carbonate is preferably a fluorinated chain-like carbonate represented by Formula (2).

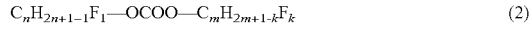

$$C_nH_{2n+1-l}F_l\text{—OCOO—}C_mH_{2m+1-k}F_k \quad (2)$$

(In Formula (2), n represents 1, 2 or 3, m represents 1, 2, or 3, l represents any integer of 0 to 2n+1, k represents any integer of 0 to 2m+1, and at least any of l and k is an integer of equal to or more than 1.)

In the fluorinated chain-like carbonate represented by Formula (2), when the amount of fluorine substitution is small, the fluorinated chain-like carbonate reacts with the positive electrode having a high potential, and thus there is a case where the capacity retention of the battery decreases or gas is generated. On the other hand, when the amount of fluorine substitution is too large, there is a case where the compatibility of the chain-like carbonate with other solvents degrades or the boiling point of the chain-like carbonate decreases. For the above-described reason, the amount of fluorine substitution is preferably equal to or more than 1% and equal to or less than 90%, more preferably equal to or more than 5% and equal to or less than 85%, and still more preferably equal to or more than 10% and equal to or less than 80%. That is, l, m, and n in Formula (2) preferably satisfy the following relational expression.

$$0.01 \leq (1+k)/(2n+2m+2) \leq 0.9$$

The chain-like carbonate has an effect for decreasing the viscosity of the electrolytic solution and is capable of increasing the conductivity of the electrolytic solution. From these viewpoints, the content rate of the chain-like carbonate in the non-aqueous electrolytic solvent is preferably equal to or more than 5% by mass, more preferably equal to or more than 10% by mass, and still more preferably equal to or more than 15% by mass. In addition, the content of the chain-like carbonate in the non-aqueous electrolytic solvent is preferably equal to or less than 90% by mass, more preferably equal to or less than 80% by mass, and still more preferably equal to or less than 70% by mass.

In addition, the content rate of the fluorinated chain-like carbonate is not particularly limited, but is preferably equal to or more than 0.1% by volume and equal to or less than 70% by volume in the non-aqueous electrolytic solvent. When the content rate of the fluorinated chain-like carbonate in the non-aqueous electrolytic solvent is equal to or more than the above-described lower limit value, it is possible to decrease the viscosity of the electrolytic solution and enhances the conduction property. In addition, an effect for enhancing the oxidation resistance is obtained. In addition, when the content rate of the fluorinated chain-like carbonate in the non-aqueous electrolytic solvent is equal to or less than the above-described upper limit value, it is possible to maintain the conduction property of the electrolytic solution at a high level. In addition, the content rate of the fluorinated chain-like carbonate in the non-aqueous electrolytic solvent is more preferably equal to or more than 1% by volume, still more preferably equal to or more than 5% by volume, and particularly preferably equal to or more than 10% by volume. In addition, the content rate of the fluorinated chain-like carbonate in the non-aqueous electrolytic solvent is more preferably equal to or less than 65% by volume, still more preferably equal to or less than 60% by volume, and particularly preferably equal to or less than 55% by volume.

The non-aqueous electrolytic solvent may include a fluorine-containing ester of phosphoric acid represented by Formula (3).

(In Formula (3), $R_1$, $R_2$, and $R_3$ each independently represent a substituted or unsubstituted alkyl group, and at least one of $R_1$, $R_2$, and $R_3$ is a fluorine-containing alkyl group.)

In addition, the non-aqueous electrolytic solvent may include a fluorine-containing chain-like ether represented by Formula (4).

$$A\text{-}O\text{---}B \qquad (4)$$

(In Formula (4), A and B each independently represent a substituted or unsubstituted alkyl group, and at least one of A and B is a fluorine-containing alkyl group.)

When the above-described non-aqueous electrolytic solvent is used, it is possible to suppress the volume expansion of the secondary battery 10 and improve the capacity retention. A reason therefor is not clear, but is assumed that, in the electrolytic solution containing the non-aqueous electrolytic solvent, the fluorine-containing ester of phosphoric acid and a fluorine-containing ether serve as oxidation-resistant solvents, and an acid anhydride forms a reaction product on the electrodes, whereby the reaction of the electrolytic solution is suppressed, and the volume expansion can be suppressed. Furthermore, it is considered that the fluorine-containing ester of phosphoric acid and the fluorine-containing ether act in a synergetic manner, whereby it is possible to make the cycle characteristics more favorable. This is a characteristic that exhibits a more significant effect during the use or after the storage of the secondary battery under a long-term charge and discharge cycle or a high-temperature condition in which the decomposition of the electrolytic solution becomes a significant problem and during the use of a positive electrode active material having a high potential.

The content rate of the fluorine-containing ester of phosphoric acid represented by Formula (3) that is included in the non-aqueous electrolytic solvent is not particularly limited, but is preferably equal to or more than 5% by volume and equal to or less than 95% by volume in the non-aqueous electrolytic solvent. When the content rate of the fluorine-containing ester of phosphoric acid in the non-aqueous electrolytic solvent is equal to or more than the above-described lower limit value, an effect for enhancing the voltage resistance further improves. In addition, when the content rate of the fluorine-containing ester of phosphoric acid in the non-aqueous electrolytic solvent is equal to or less than the above-described upper limit value, the ion conduction property of the electrolytic solution improves, and the charge and discharge rate of the battery becomes more favorable. In addition, the content rate of the fluorine-containing ester of phosphoric acid in the non-aqueous electrolytic solvent is more preferably equal to or more than 10% by volume. In addition, the content rate of the fluorine-containing ester of phosphoric acid in the non-aqueous electrolytic solvent is more preferably equal to or less than 70% by volume, still more preferably equal to or less than 60% by volume, particularly preferably equal to or less than 59% by volume, and particularly preferably equal to or less than 55% by volume.

In the fluorine-containing ester of phosphoric acid represented by Formula (3), $R_1$, $R_2$, and $R_3$ each independently represent a substituted or unsubstituted alkyl group, and at least one of $R_1$, $R_2$, and $R_3$ is a fluorine-containing alkyl group. The fluorine-containing alkyl group refers to an alkyl group having at least one fluorine atom. The numbers of carbon atoms in the alkyl groups as $R_1$, $R_2$, and $R_3$ each are independently preferably equal to or more than 1 and equal to or less than 4 and more preferably equal to or more than 1 and equal to or less than 3. This is because, when the number of carbon atoms in the alkyl group is equal to or less than the above-described upper limit value, an increase in the viscosity of the electrolytic solution is suppressed, it becomes easy for the electrolytic solution to penetrate into micropores in the electrodes or the separator, the ion conduction property improves, and the current value in the charge and discharge characteristics of the battery becomes favorable.

In addition, in Formula (3), all of $R_1$, $R_2$, and $R_3$ are preferably the fluorine-containing alkyl groups.

In addition, at least one of $R_1$, $R_2$, and $R_3$ is preferably a fluorine-containing alkyl group in which equal to or more than 50% of hydrogen atoms in the corresponding unsubstituted alkyl group are substituted with fluorine atoms.

In addition, it is more preferable that all of $R_1$, $R_2$, and $R_3$ are fluorine-containing alkyl groups and $R_1$, $R_2$, and $R_3$ are fluorine-containing alkyl groups in which equal to or more than 50% of hydrogen atoms in the corresponding unsubstituted alkyl group are substituted with fluorine atoms.

This is because, when the content rate of the fluorine atoms is large, the voltage resistance further improves, and it is possible to further decrease the deterioration of the battery capacity after the cycle even in the case of using a positive electrode active material that operates at a potential of equal to or higher than 4.5 V with respect to lithium metal.

In addition, the ratio of fluorine atoms in the substituent including hydrogen atoms in the fluorine-containing alkyl group is more preferably equal to or more than 55%.

In addition, $R_1$ to $R_3$ may have a substituent other than the fluorine atom, and, as the substituent, at least one selected from the group consisting of an amino group, a carboxy group, a hydroxy group, a cyano group, and a halogen atom (for example, a chlorine atom or a bromine atom) is exemplified. Meanwhile, the above-described number of carbon atoms conceptually includes the substituent as well.

Examples of the fluorine-containing ester of phosphoric acid include tris(trifluoromethyl) phosphate, tris(trifluoroethyl) phosphate, tris(tetrafluoropropyl) phosphate, tris(pentafluoropropyl) phosphate, tris(heptafluorobutyl) phosphate, tris(octafluoropentyl) phosphate, and the like.

In addition, examples of the fluorine-containing ester of phosphoric acid include trifluoroethyl dimethyl phosphate, bis(trifluoroethyl) methyl phosphate, bistrifluoroethyl ethyl phosphate, pentafluoropropyl dimethyl phosphate, heptafluorobutyl dimethyl phosphate, trifluoroethyl methyl ethyl phosphate, pentafluoropropyl methyl ethyl phosphate, heptafluorobutyl methyl ethyl phosphate, trifluoroethyl methyl propyl phosphate, pentafluoropropyl methyl propyl phosphate, heptafluorobutyl methyl propyl phosphate, trifluoroethyl methyl butyl phosphate, pentafluoropropyl methyl butyl phosphate, heptafluorobutyl methyl butyl phosphate, trifluoroethyl diethyl phosphate, pentafluoropropyl diethyl phosphate, heptafluorobutyl diethyl phosphate, trifluoroethyl ethyl propyl phosphate, pentafluoropropyl ethyl propyl phosphate, heptafluorobutyl ethyl propyl phosphate, trifluoroethyl ethyl butyl phosphate, pentafluoropropyl ethyl butyl phosphate, heptafluorobutyl ethyl butyl phosphate, trifluoroethyl ethyl dipropyl phosphate, pentafluoropropyl dipropyl phosphate, heptafluorobutyl dipropyl phosphate, trifluoroethyl propyl butyl phosphate, pentafluoropropyl propyl butyl phosphate, heptafluorobutyl propyl butyl phosphate, trifluoroethyl dibutyl phosphate, pentafluoropropyl dibutyl phosphate, heptafluorobutyl dibutyl phosphate, and the like.

Examples of tris(tetrafluoropropyl) phosphate include tris (2,2,3,3-tetrafluoropropyl) phosphate.

Examples of tris(pentafluoropropyl) phosphate include tris(2,2,3,3,3-pentafluoropropyl) phosphate.

Examples of tris(trifluoroethyl) phosphate include tris(2,2,2-trifluoroethyl) phosphate (hereinafter, also abbreviated as PTTFE) and the like.

Examples of tris(heptafluorobutyl) phosphate include tris(1H,1H-heptafluorobutyl) phosphate and the like.

Examples of tris(octafluoropentyl) phosphate include tris(1H,1H,5H-octafluoropentyl) phosphate and the like.

Among these, tris(2,2,2-trifluoroethyl) phosphate represented by Formula (3-1) is preferred since an effect for suppressing the decomposition of the electrolytic solution at a high potential is strong.

The fluorine-containing ester of phosphoric acid can be used singly or two or more fluorine-containing esters of phosphoric acid can be jointly used.

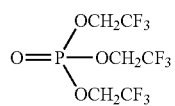

(3-1)

The non-aqueous electrolytic solvent may include an ester of carboxylic acid.

The ester of carboxylic acid is not particularly limited, and examples thereof include ethyl acetate, methyl propionate, ethyl formate, ethyl propionate, methyl butyrate, ethyl butyrate, methyl acetate, methyl formate, and the like.

In addition, the ester of carboxylic acid also includes a fluorinated ester of carboxylic acid, and examples of the fluorinated ester of carboxylic acid include compounds having a structure obtained by substituting part or all of hydrogen atoms in ethyl acetate, methyl propionate, ethyl formate, ethyl propionate, methyl butyrate, ethyl butyrate, methyl acetate, or methyl formate with fluorine atoms and the like.

In addition, as the fluorinated ester of carboxylic acid, specifically, ethyl pentafluoropropionate, ethyl 3,3,3-trifluoropropionate, methyl 2,2,3,3-tetrafluoropropionate, 2,2-difluoroethyl acetate, methyl heptafluoroisobutyrate, methyl 2,3,3,3-tetrafluoropropionate, methyl pentafluoropropionate, methyl 2-(trifluoromethyl)-3,3,3-trifluoropropionate, ethyl heptafluorobutyrate, methyl 3,3,3-trifluoropropionate, 2,2,2-trifluoroethyl acetate, isopropyl trifluoroacetate, tert-butyl trifluoroacetate, ethyl 4,4,4-trifluorobutyrate, methyl 4,4,4-trifluorobutyrate, butyl 2,2-difluoroacetate, ethyl difluoroacetate, n-butyl trifluoroacetate, 2,2,3,3-tetrafluoropropyl acetate, ethyl 3-(trifluoromethyl) butyrate, methyl tetrafluoro-2-(methoxy) propionate, 3,3,3 trifluoropropyl 3,3,3-trifluoropropionate, methyl difluoroacetate, 2,2,3,3-tetrafluoropropyl trifluoroacetate, 1H,1H-heptafluorobutyl acetate, methyl heptafluorobutyrate, ethyl trifluoroacetate, and the like are exemplified.

Among these, the ester of carboxylic acid is preferably ethyl propionate, methyl acetate, methyl 2,2,3,3-tetrafluoropropionate, and 2,2,3,3-tetrafluoropropyl trifluoroacetate are preferred. Similar to the chain-like carbonate, the ester of carboxylic acid has an effect for decreasing the viscosity of the electrolytic solution. Therefore, for example, the ester of carboxylic acid can be used instead of the chain-like carbonate and also can be jointly used with the chain-like carbonate.

A chain-like ester of carboxylic acid has a characteristic that, in a case where the number of carbon atoms in a substituent that is added to a "—COO—" structure is small, the viscosity is low, but the boiling point also tends to decrease. There is a case where a chain-like ester of carboxylic acid having a low boiling point gasifies during the operation of the battery at a high temperature. On the other hand, when the number of carbon atoms is too large, the viscosity of the electrolytic solution increases, and there is a case where the conduction property degrades. For the above-described reason, the total number of carbon atoms in two substituents that are added to the "—COO—" structure of the chain-like ester of carboxylic acid is preferably equal to or more than 3 and equal to or less than 8. In addition, in a case where the substituent that is added to the "—COO—" structure contains a fluorine atom, it is possible to improve the oxidation resistance of the electrolytic solution. For the above-described reason, the chain-like ester of carboxylic acid is preferably a fluorinated chain-like ester of carboxylic acid represented by Formula (5).

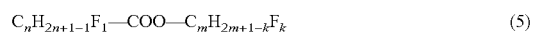

(5)

(In Formula (5), n represents 1, 2, 3, or 4, m represents 1, 2, 3, or 4, l represents any integer of 0 to 2n+1, k represents any integer of 0 to 2m+1, and at least any of l and k is an integer of equal to or more than 1.)

In the fluorinated chain-like ester of carboxylic acid represented by Formula (5), when the amount of fluorine substitution is small, the fluorinated chain-like ester of carboxylic acid reacts with the positive electrode having a high potential, and thus there is a case where the capacity retention of the battery decreases or gas is generated. On the other hand, when the amount of fluorine substitution is too large, there is a case where the compatibility of the chain-like ester of carboxylic acid with other solvents degrades or the boiling point of the chain-like ester of carboxylic acid decreases. For the above-described reason, the amount of fluorine substitution is preferably equal to or more than 1% and equal to or less than 90%, more preferably equal to or more than 10% and equal to or less than 85%, and still more preferably equal to or more than 20% and equal to or less than 80%. That is, l, m, and n in Formula (5) preferably satisfy the following relational expression.

$$0.01 \le (l+k)/(2n+2m+2) \le 0.9$$

The content rate of the ester of carboxylic acid in the non-aqueous electrolytic solvent is preferably equal to or more than 0.1% by mass, more preferably equal to or more than 0.2% by mass, still more preferably equal to or more than 0.5% by mass, and particularly preferably equal to or more than 1% by mass. The content rate of the ester of carboxylic acid in the non-aqueous electrolytic solvent is preferably equal to or less than 50% by mass, more preferably equal to or less than 20% by mass, still more preferably equal to or less than 15% by mass, and particularly preferably equal to or less than 10% by mass. When the content rate of the ester of carboxylic acid is set to be equal to or more than the above-described lower limit value, it is possible to further improve the low-temperature characteristics and further improve the conductivity. In addition, when the content rate of the ester of carboxylic acid is set to be equal to or less than the above-described upper limit value, it is possible to mitigate the vapor pressure of the battery becoming too high in the case of being left to stand at a high temperature.

In addition, the content rate of the fluorinated chain-like ester of carboxylic acid is not particularly limited, but is preferably equal to or more than 0.1% by volume and equal to or less than 50% by volume in the non-aqueous electrolytic solvent. When the content rate of the fluorinated chain-like ester of carboxylic acid in the non-aqueous electrolytic solvent is equal to or more than the above-described lower limit value, it is possible to decrease the viscosity of the electrolytic solution and enhances the conduction property. In addition, an effect for enhancing the oxidation resistance is obtained. In addition, when the content rate of the fluorinated chain-like ester of carboxylic acid in the non-aqueous electrolytic solvent is equal to or less than the above-described upper limit value, it is possible to maintain the conduction property of the electrolytic solution at a high level and ensure the compatibility of the electrolytic solution. In addition, the content rate of the fluorinated chain-like ester of carboxylic acid in the non-aqueous electrolytic solvent is more preferably equal to or more than 1% by volume, still more preferably equal to or more than 5% by volume, and particularly preferably equal to or more than 10% by volume. In addition, the content rate of the fluorinated chain-like ester of carboxylic acid in the non-aqueous electrolytic solvent is more preferably equal to or less than 45% by volume, still more preferably equal to or less than 40% by volume, and particularly preferably equal to or less than 35% by volume.

The non-aqueous electrolytic solvent may include an alkylene biscarbonate represented by Formula (6) in addition to the fluorine-containing ester of phosphoric acid. The oxidation resistance of the alkylene biscarbonate is equal to or slightly stronger than that of the chain-like carbonate, and thus it is possible to improve the voltage resistance of the electrolytic solution.

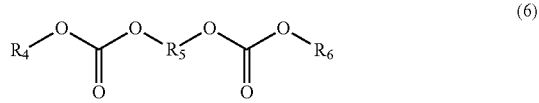

(6)

($R_4$ and $R_6$ each independently represent a substituted or unsubstituted alkyl group. $R_5$ represents a substituted or unsubstituted alkylene group.)

In Formula (6), the alkyl group may be a straight-chain-like or branched-chain-like alkyl group, and the number of carbon atoms is preferably 1 to 6 and more preferably 1 to 4. The alkylene group is a divalent saturated hydrocarbon group and may be a straight-chain-like or branched-chain-like alkylene group, and the number of carbon atoms is preferably 1 to 4 and more preferably 1 to 3.

Examples of the alkylene biscarbonate represented by Formula (6) include 1,2-bis(methoxycarbonyloxy) ethane, 1,2-bis(ethoxycarbonyloxy) ethane, 1,2-bis(methoxycarbonyloxy) propane, 1-ethoxycarbonyloxy-2-methoxycarbonyloxyethane, and the like. Among these, 1,2-bis(methoxycarbonyloxy) ethane is preferred.

The content rate of the alkylene biscarbonate in the non-aqueous electrolytic solvent is preferably equal to or more than 0.1% by volume, more preferably equal to or more than 0.5% by volume, still more preferably equal to or more than 1% by volume, and particularly preferably equal to or more than 1.5% by volume. The content rate of the alkylene biscarbonate in the non-aqueous electrolytic solvent is preferably equal to or less than 70% by volume, more preferably equal to or less than 60% by volume, still more preferably equal to or less than 50% by volume, and particularly preferably equal to or less than 40% by volume.

The alkylene biscarbonate is a material having a low permittivity. Therefore, the alkylene biscarbonate can be used instead of, for example, the chain-like carbonate or can be jointly used with the chain-like carbonate.

The non-aqueous electrolytic solvent may include a chain-like ester.

The chain-like ether is not particularly limited, and examples thereof include 1,2-ethoxyethane (DEE), ethoxymethoxyethane (EME), and the like.

In addition, as the chain-like ether, a halogenated chain-like ester such as a fluorine-containing ether may also be included. The halogenated chain-like ether has strong oxidation resistance and is preferably used in the case of the positive electrode that operates at a high potential.

The chain-like ether, similar to the chain-like carbonate, has an effect for decreasing the viscosity of the electrolytic solution. Therefore, the chain-like ether can be used instead of the chain-like carbonate and the ester of carboxylic acid and can also be jointly used with the chain-like carbonate or the ester of carboxylic acid.

In addition, the content rate of the chain-like ether is not particularly limited, but is preferably equal to or more than 0.1% by volume and equal to or less than 70% by volume in the non-aqueous electrolytic solvent. When the content rate of the chain-like ether in the non-aqueous electrolytic solvent is equal to or more than 0.1% by volume, it is possible to decrease the viscosity of the electrolytic solution and enhances the conduction property. In addition, an effect for enhancing the oxidation resistance is obtained. In addition, when the content rate of the chain-like ether in the non-aqueous electrolytic solvent is equal to or less than 70% by volume, it is possible to maintain the conduction property of the electrolytic solution at a high level and ensure the compatibility of the electrolytic solution. In addition, the content rate of the chain-like ether in the non-aqueous electrolytic solvent is more preferably equal to or more than 1% by volume, still more preferably equal to or more than 5% by volume, and particularly preferably equal to or more than 10% by volume. In addition, the content rate of the chain-like ether in the non-aqueous electrolytic solvent is more preferably equal to or less than 65% by volume, still more preferably equal to or less than 60% by volume, and particularly preferably equal to or less than 55% by volume.

The non-aqueous electrolytic solvent may include a sulfone compound represented by Formula (7).

(7)

(In the formula, $R_1$ and $R_2$ each independently represent a substituted or unsubstituted alkyl group. A carbon atom in $R_1$ and a carbon atom in $R_2$ may bond together through a single bond or a double bond to form a ring structure.)

In the sulfone compound represented by Formula (7), the number of carbon atoms $n_1$ in $R_1$ and the number of carbon atoms $n_2$ in $R_2$ are preferably $1 \leq n_1 \leq 12$ and $1 \leq n_2 \leq 12$, more preferably $1 \leq n_1 \leq 6$ and $1 \leq n_2 \leq 6$, and still more preferably $1 \leq n_1 \leq 3$ and $1 \leq n_2 \leq 3$ respectively. In addition, the alkyl group may be a straight-chain-like, branched-chain-like or cyclic alkyl group.

In $R_1$ and $R_2$, examples of a substituent include alkyl groups having 1 to 6 carbon atoms (for example, a methyl group, an ethyl group, a propyl group, an isopropyl group, a butyl group, and an isobutyl group) and aryl groups having 6 to 10 carbon atoms (for example, a phenyl group and a naphthyl group).

In an embodiment, the sulfone compound is more preferably a cyclic sulfone compound represented by Formula (7-1).

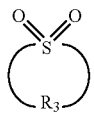

(7-1)

(In the formula, R₃ represents a substituted or unsubstituted alkylene group.)

In R₃, the number of carbon atoms in the alkylene group is preferably 4 to 9 and more preferably 4 to 6.

In R₃, examples of a substituent include alkyl groups having 1 to 6 carbon atoms (for example, a methyl group, an ethyl group, a propyl group, an isopropyl group, and a butyl group), halogen atoms (for example a chlorine atom, a bromine atom, and a fluorine atom), and the like.

The cyclic sulfone compound is more preferably a compound represented by Formula (7-2).

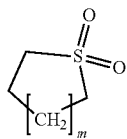

(7-2)

(In the formula, m represents an integer of 1 to 6.)

In Formula (7-2), m is an integer of 1 to 6 and preferably an integer of 1 to 3.

As the cyclic sulfone compound represented by Formula (7-1), for example, tetramethylene sulfone (sulfolane), pentamethylene sulfone, hexamethylene sulfone, and the like. In addition, examples of the cyclic sulfone compound having a substituent include 3-methyl sulfolane, 2,4-dimethyl sulfolane, and the like.

In addition, the sulfone compound may be a chain-like sulfone compound. Examples of the chain-like sulfone compound include ethyl methyl sulfone, ethyl isopropyl sulfone, ethyl isobutyl sulfone, dimethyl sulfone, diethyl sulfone, and the like. Among these, ethyl methyl sulfone, ethyl isopropyl sulfone, and ethyl isobutyl sulfone are preferred.

The sulfone compound has compatibility with other solvents such as fluorinated ether compounds and has a relatively high permittivity and is thus excellent in terms of the dissolution/dissociation action of lithium salts. The sulfone compound can be used singly or two or more sulfone compounds can be used in a mixture form.

In the case of including the sulfone compound, the content in the non-aqueous electrolytic solvent is preferably equal to or more than 1% by volume and equal to or less than 75% by volume and more preferably equal to or more than 5% by volume and equal to or less than 50% by volume. When the content of the sulfone compound is equal to or more than the above-described lower limit value, the compatibility of the electrolytic solution improves. When the content of the sulfone compound is too large, the viscosity of the electrolytic solution increases, and there is a concern that, particularly, the capacity decrease of the charge and discharge cycle characteristics at room temperature may be caused.

The non-aqueous electrolytic solvent may include an acid anhydride. The content rate of the acid anhydride that is included in the non-aqueous electrolytic solvent is not particularly limited, but is, generally, preferably equal to or more than 0.01% by mass and less than 10% by mass and more preferably equal to or more than 0.1% by mass and less than 5% by mass in the non-aqueous electrolytic solvent. When the content rate of the acid anhydride in the non-aqueous electrolytic solvent is equal to or more than 0.01% by mass, an effect for increasing the capacity retention is obtained, and an effect for suppressing the generation of gas by the decomposition of the electrolytic solution is obtained. The content rate of the acid anhydride in the non-aqueous electrolytic solvent is more preferably equal to or more than 0.1% by mass. In addition, when the content rate of the acid anhydride in the non-aqueous electrolytic solvent is less than 10% by mass, it is possible to maintain a favorable capacity retention, and it is also possible to suppress the amount of gas generated by the decomposition of the acid anhydride. The content rate of the acid anhydride in the non-aqueous electrolytic solvent is more preferably equal to or less than 5% by mass. The content rate of the acid anhydride in the non-aqueous electrolytic solvent is still more preferably equal to or more than 0.5% by mass and particularly preferably equal to or more than 0.8% by mass. In addition, the content rate of the acid anhydride in the non-aqueous electrolytic solvent is still more preferably equal to or less than 3% by mass and particularly preferably equal to or less than 2% by mass.

As the acid anhydride, for example, a carboxylic anhydride, a sulfonic anhydride, and anhydrides of carboxylic acid and sulfonic acid, and the like are exemplified.

The acid anhydride in the electrolytic solution is considered to form a reaction product on the electrodes to suppress the volume expansion of the battery in association with charging and discharging and have an effect for improving the cycle characteristics. In addition, although it is reasoning, the above-described acid anhydride bonds to moisture in the electrolytic solution and is thus considered to also have an effect for suppressing the generation of gas attributed to the moisture.

Examples of the acid anhydride include a chain-like acid anhydride represented by Formula (8) and a cyclic acid anhydride represented by Formula (9).

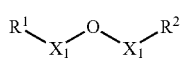

(8)

(In Formula (8), two X₁'s each independently represent a carbonyl group (—C(=O)—) or a sulfonyl group (—S(=O)₂—), R¹ and R² each independently represent an alkyl group having 1 to 10 carbon atoms, an alkenyl group having 2 to 10 carbon atoms, a cycloalkyl group having 3 to 10 carbon atoms, an aryl group having 6 to 18 carbon atoms, or an aryl alkyl group having 7 to 20 carbon atoms, and at least one hydrogen atom in R₁ and R₂ may be substituted with a halogen atom.)

(9)

(In Formula (9), two $X_2$'s each independently represent a carbonyl group (—C(═O)—) or a sulfonyl group (—S(═O)$_2$—), $R^3$ represents an alkylene group having 1 to 10 carbon atoms, an alkenylene group having 2 to 10 carbon atoms, an arylene group having 6 to 12 carbon atoms, a cycloalkylene group having 3 to 12 carbon atoms, a cycloalkenylene group having 3 to 12 carbon atoms, or a heterocycloalkylene group having 3 to 10 carbon atoms, and at least one hydrogen atom in $R^3$ may be substituted with a halogen atom.)

The groups represented by $R^1$, $R^2$, and $R^3$ in Formula (8) and Formula (9) will be described below.

In Formula (8), the alkyl group and the alkenyl group each may be a straight chain or may have a branched chain, and the number of carbon atoms is generally 1 to 10, preferably 1 to 8, and more preferably 1 to 5.

In Formula (8), the number of carbon atoms in the cycloalkyl group is preferably 3 to 10 and more preferably 3 to 6.

In Formula (8), the number of carbon atoms in the aryl group is preferably 6 to 18 and more preferably 6 to 12. Examples of the aryl group include a phenyl group, a naphthyl group, and the like.

In Formula (8), the number of carbon atoms in the aryl alkyl group is preferably 7 to 20 and more preferably 7 to 14. Examples of the aryl alkyl group include a benzyl group, a phenylethyl group, a naphthyl methyl group, and the like.

In Formula (8), $R^1$ and $R^2$ each are independently an alkyl group having 1 to 3 carbon atoms or a phenyl group.

In Formula (9), the alkylene group and the alkenylene group each may be a straight chain or may have a branched chain, and the number of carbon atoms is generally 1 to 10, preferably 1 to 8, and more preferably 1 to 5.

In Formula (9), the number of carbon atoms in the alkylene group is preferably 6 to 20 and more preferably 6 to 12. Examples of the arylene group include a phenylene group, a naphthylene group, a biphenylene group, and the like.

In Formula (9), the number of carbon atoms in the cycloalkylene group is generally 3 to 12, preferably 3 to 10, and more preferably 3 to 8. The cycloalkylene group may be a monocycle or may have a plurality of ring structures like a bicycloalkylene group.

In Formula (9), the number of carbon atoms in the cycloalkenylene group is generally, 3 to 12, preferably 3 to 10, and more preferably 3 to 8. The cycloalkenylene group may be a monocycle or may have a plurality of ring structures in which at least one ring has an unsaturated bond like a bicycloalkenylene group. Examples of the cycloalkenylene group include divalent groups formed of cyclohexene, bicycle[2.2.1]heptane, bicycle[2.2.2]octane, or the like.

In Formula (9), the heterocycloalkylene group represents a divalent group in which at least one carbon atom on the ring of a cycloalkylene group is substituted with one or more hetero atoms such as sulfur, oxygen, nitrogen, and the like. The heterocycloalkylene group is preferably a 3- to 10-membered ring, more preferably a 4- to 8-membered ring, and still more preferably a 5- or 6-membered ring.

In Formula (9), $R^3$ is more preferably an alkylene group having 1 to 3 carbon atoms, an alkenylene group having 2 or 3 carbon atoms, a cyclohexylene group, a cyclhexynylene group, or a phenylene group.

The acid anhydride may be partially halogenated. Examples of a halogen atom include chlorine, iodine, bromine, fluorine, and the like, and, among these, chlorine and fluorine are preferred, and fluorine is more preferred.

In addition, the acid anhydride represented by Formula (8) or Formula (9) may have a non-halogen substituent. As the substituent, alkyl group having 1 to 5 carbon atoms, an alkenyl group having 2 to 5 carbon atoms, an alkoxy group having 1 to 5 carbon atoms, an aryl group having 6 to 12 carbon atoms, an amino group, a carboxy group, a hydroxy group, a cyano group, and the like, but the substituent is not limited thereto. For example, at least one hydrogen atom in a saturated or unsaturated hydrocarbon ring that is included in $R^1$, $R^2$, or $R^3$ may be substituted with an alkyl group having 1 to 3 carbon atoms.

Examples of the carboxylic anhydride include chain-like acid anhydrides such as acetic anhydride, propionic anhydride, butyric anhydride, crotonic anhydride, benzoic anhydride, and the like; acid anhydrides having a ring structure (cyclic acid anhydrides) such as succinic anhydride, glutaric anhydride, maleic anhydride, phthalic anhydride, 5,6-dihydroxy-1,4-dithiin-2,3 dicarboxylic anhydride, 5-norbornene-2,3-dicarboxylic anhydride, 1,2,3,6-tetrahydrophthalic anhydride, and bicyclo[2.2.2]oct-5-ene-2,3-dicarboxylic anhydride, and the like; and the like.

In addition, as halides, for example, difluoroacetic anhydride, 3H-perfluoropropanoic anhydride, 3,3,3-trifluoropropionic anhydride, pentafluoropropionic anhydride, 2,2,3,3,4,4-hexafluoropentanedioic anhydride, tetrafluorosuccinic anhydride, trifluoroacetic anhydride, and the like are exemplified. In addition, it is also possible to use acid anhydrides having other substituent such as 4-methylphthalic anhydride in addition to the halides.

Examples of the sulfonic anhydride include chain-like sulfonic anhydrides such as methanesulfonic anhydride, ethanesulfonic anhydride, propanesulfonic anhydride, butanesulfonic anhydride, pentanesulfonic anhydride, hexanesulfonic anhydride, vinylsulfonic anhydride, benzenesulfonic acid anhydride, and the like; cyclic sulfonic anhydrides such as 1,2-ethanedisulfonic anhydride, 1,3-propane disulfonic anhydride, 1,4-butanedisulfonic anhydride, 1,2-benzenedisulfonic anhydride, and the like; halides thereof; and the like.

Examples of the anhydrides of carboxylic acid and sulfonic acid include chain-like acid anhydrides such as acetic acid methanesulfonic anhydride, acetic acid ethanesulfonic anhydride, acetic acid propanesulfonic anhydride, propionic acid methanesulfonic anhydride, propionic acid ethanesulfonic anhydride, propionic acid propanesulfonic anhydride, and the like; cyclic acid anhydrides such as 3-sulfopropionic anhydride, 2-methyl-3-sulfopropionic anhydride, 2,2-dimethyl-3-sulfopropionic anhydride, 2-ethyl-3-sulfopropionic anhydride, 2,2-diethyl-3-sulfopropionic anhydride, 2-sulfobenzoic anhydride, and the like; halides thereof; and the like.

Among these, the acid anhydride is preferably a carboxylic anhydride having a structure represented by [—(C═O)—O—(C═O)—] in the molecule. Examples of the carboxylic anhydride include a chain-like carboxylic anhydride represented by Formula (8-1) and a cyclic carboxylic anhydride represented by Formula (9-1).

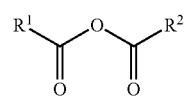

(8-1)

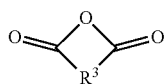
(9-1)

Meanwhile, groups represented by $R^1$, $R^2$, and $R^3$ in Formula (8-1) and Formula (9-1) are identical to those exemplified in Formula (8) and Formula (9).

As examples of a preferred compound of the acid anhydride, acetic anhydride, maleic anhydride, phthalic anhydride, propionic anhydride, succinic anhydride, benzoic anhydride, 5,6-dihydroxy-1,4-dithiin-2,3-dicarboxylic acid, 5-norbornene-tetrahydrophthalic anhydride, bicyclo[2.2.2]oct-5-ene-2,3-dicarboxylic anhydride, and the like; acid anhydrides having a halogen or other substituent such as difluoroacetic anhydride, 3H-perfluoropropionic anhydride, trifluoropropionic anhydride, pentafluoropropionic anhydride, 2,2,3,3,4,4-hexafluoropentanedioic anhydride, tetrafluorosuccinic anhydride, trifluoroacetic anhydride, 4-methylphthalic anhydride, and the like; and the like.

The non-aqueous electrolytic solvent may also include the following substance in addition to the above-described substance. The non-aqueous electrolytic solvent may include, for example, γ-lactones such as γ-butyrolactone, cyclic ethers such as tetrahydrofuran, 2-methyltetrahydrofuran, and the like, and the like. In addition, the non-aqueous electrolytic solvent may include a substance obtained by substituting some of hydrogen atoms in the above-described material with fluorine atoms. In addition, additionally, the non-aqueous electrolytic solvent may also include an aprotic organic solvent such as dimethyl sulfoxide, 1,3-dioxolane, formamide, acetamide, dimethylformamide, dioxolane, acetonitrile, propylnitrile, nitromethane, ethyl monoglyme, trimethoxymethane, a dioxolane derivative, methylsulfolane, 1,3-dimethyl-2-imidazolidinone, 3-methyl-2-oxazolidinone, a propylene carbonate derivative, a tetrahydrofuran derivative, ethyl ether, 1,3-propane sultone, anisole, or N-methylpyrrolidone. In addition, the non-aqueous electrolytic solvent may include a cyclic ester of sulfonic acid. For example, a cyclic ester of monosulfonic acid is preferably a compound represented by Formula (10).

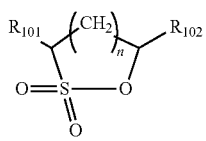
(10)

(In Formula (10), $R_{101}$ and $R_{102}$ each independently represent a hydrogen atom, a fluorine atom, or an alkyl group having 1 to 4 carbon atoms. n represents 0, 1, 2, 3, or 4.)

In addition, for example, a cyclic ester of disulfonic acid is preferably a compound represented by Formula (10-1).

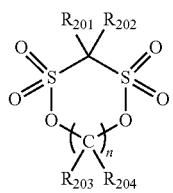
(10-1)

(In Formula (10-1), $R_{201}$ and $R_{204}$ each independently represent a hydrogen atom, a fluorine atom, or an alkyl group having 1 to 4 carbon atoms. n represents 0, 1, 2, 3, or 4.)

Examples of the cyclic ester of sulfonic acid include esters of monosulfonic acid such as 1,3-propane sultone, 1,2-propane sultone, 1,4-butane sultone, 1,2-butane sultone, 1,3-butane sultone, 2,4-butane sultone, 1,3-pentane sultone, and the like, esters of disulfonic acid such as esters of methylene methane disulfonic acid, esters of ethylene methane disulfonic acid, and the like, and the like. Among these, as 1,3-propane sultone, 1,4-butane sultone, and esters of methylene methane disulfonic acid are preferred.

The content of the cyclic ester of sulfonic acid in the electrolytic solution is preferably 0.01% to 10% by mass and more preferably 0.1% to 5% by mass. In a case where the content of the cyclic ester of sulfonic acid is equal to or more than 0.01% by mass, it is possible to more effectively form a coat on the surface of the positive electrode and suppress the decomposition of the electrolytic solution.

As the supporting electrolyte, for example, lithium salts such as $LiPF_6$, $LiAsF_6$, $LiAlCl_4$, $LiClO_4$, $LiBF_4$, $LiSbF_6$, $LiCF_3SO_3$, $LiC_4F_9CO_3$, $LiC(CF_3SO_2)_2$, $LiN(CF_3SO_2)_2$, $LiN(C_2F_5SO_2)_2$, $LiB_{10}Cl_{10}$, and the like are exemplified. In addition, as the supporting electrolyte, additionally, lower aliphatic carboxylic acid lithium carboxylate, chloroborane lithium, tetraphenyl borate lithium, LiBr, LiI, LiSCN, LiCl, and the like. The supporting electrolyte can be used singly or two or more supporting electrolytes can be used in combination.

In addition, it is possible to add an ion conductive polymer to the non-aqueous electrolytic solvent. As the ion conductive polymer, for example, polyethers such as polyethylene oxide, polypropylene oxide, and the like, polyolefins such as polyethylene, polypropylene, and the like, and the like. In addition, as the ion conductive polymer, for example, polyvinylidene fluoride, polytetrafluoroethylene, polyvinyl fluoride, polyvinyl chloride, polyvinylidene chloride, polymethyl methacrylate, polymethyl acrylate, polyvinyl alcohol, polymethacrylonitrile, polyvinyl acetate, polyvinyl pyrrolidone, polycarbonate, polyethylene terephthalate, polyhexamethylene adipamide, polycaprolactam, polyurethane, polyethyleneimine, polybutadiene, polystyrene, or polyisoprene, or derivatives thereof. The ion conductive polymer can be used singly or two or more ion conductive polymers can be used in combination. In addition, a polymer including a variety of monomers that constitute the above-described polymer may be used.

The solid electrolyte is not particularly specified as long as the solid electrolyte has a function of a solid electrolyte, and it is possible to use, for example, Na-β-$Al_2O_3$, polyethylene oxide (PEO) that is a polymeric solid electrolyte, an oxide ion conductor called a lithium superionic conductor (LISICON), or a sulfide-based solid electrolyte (thio-LISICON or the like).

(Shape of Secondary Battery)

As a shape of the secondary battery 10 according to the present embodiment, for example, a cylindrical shape, a square shape, a coin shape, a button shape, a laminate shape, and the like are exemplified. As the exterior bodies 6 and 7 of the secondary battery 10, for example, stainless steel, iron, aluminum, titanium, alloys thereof, plated products thereof, and the like. As plating, it is possible to use, for example, nickel plating.

In addition, as a laminate resin film that is used for the laminate shape, for example, aluminum, an aluminum alloy, a titanium foil, and the like are exemplified. As a material of a thermally fused portion of a metal laminate resin film, for example, thermoplastic polymeric materials such as polyethylene, polypropylene, and polyethylene terephthalate are exemplified. In addition, the numbers of metal laminate resin layers or metal foil layers each are not limited to one and may be two or more.

As the exterior bodies 6 and 7, any exterior bodies can be appropriately selected as long as the exterior bodies are stable to the electrolytic solution and have a sufficient water vapor barrier property. For example, in the case of a laminate-type secondary battery, it is possible to use, for example, laminate films of polypropylene, polyethylene, or the like coated with aluminum or silica as the exterior bodies. Particularly, from the viewpoint of suppressing the volume expansion, an aluminum laminate film is preferably used.

EXAMPLES

Hereinafter, specific examples to which the present invention is applied will be described, but the present invention is not limited to the present examples and can be appropriately modified and carried out within the scope of the gist of the present invention.

Example 1

As a negative electrode active material of the present example, artificial graphite coated with a poorly crystalline carbon material is used. The artificial graphite coated with a poorly crystalline carbon material, a conductive auxiliary agent that is a spherical carbon material, and a binding agent for a negative electrode are mixed together in a mass ratio of 97.7/0.3/2 and dispersed in N-methylpyrrolidone, thereby preparing a slurry for a negative electrode. The slurry for a negative electrode is uniformly applied onto a 10 μm-thick Cu current collector. The slurry for a negative electrode is dried and then compressed using a roll press, thereby producing a negative electrode.

As a non-aqueous electrolytic solvent, a solvent obtained by mixing ethylene carbonate (EC) and diethylene carbonate (DEC) in a volume ratio of 3/7 is used. Hereinafter, the present solvent will be also abbreviated as the solvent EC/DEC. $LiPF_6$ is dissolved in this non-aqueous electrolytic solvent in a concentration of 1 mol/L, thereby preparing an electrolytic solution.

A solid solution of $LiNiO_2$ and $Li_2MnO_3$ that are positive electrode active materials, polyvinylidene fluoride (4% by mass) that is a binding agent for a positive electrode, and carbon black that is a conductive auxiliary agent are mixed together, thereby preparing a positive electrode mixture. The positive electrode mixture is dispersed in N-methyl-2-pyrrolidone (NMP), thereby preparing a slurry for a positive electrode in which PVDF is uniformly dispersed in a NMP solution. The slurry for a positive electrode is uniformly applied to both surfaces of a 20 μm-thick aluminum positive electrode current collector. Coating layers of the slurry for a positive electrode are dried and then compressed using a roll press, thereby forming a positive electrode active material and producing a positive electrode.

Figure 3:
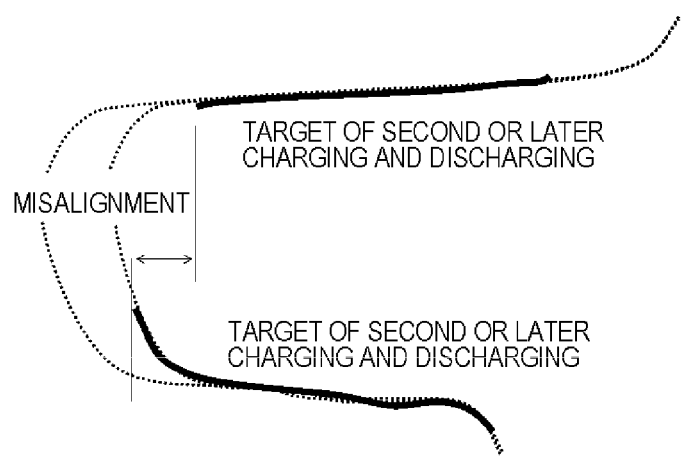
FIG. 3 is a view showing an example of a relationship between first-time charge and discharge characteristics of the positive electrode and first-time charge and discharge characteristics of the negative electrode in the case of using an electrode element in which the positive electrode has a larger irreversible capacity than the negative electrode.

A relationship between first-time charge and discharge curves of the obtained negative electrode and the obtained positive electrode when both electrodes are combined together is shown in FIG. 3. In the present constitution, the positive electrode has a larger irreversible capacity than the negative electrode, and thus there is "misalignment" compared to the target positional relationship of FIG. 2, and a treatment that corrects the misalignment becomes necessary.

Figure 4:
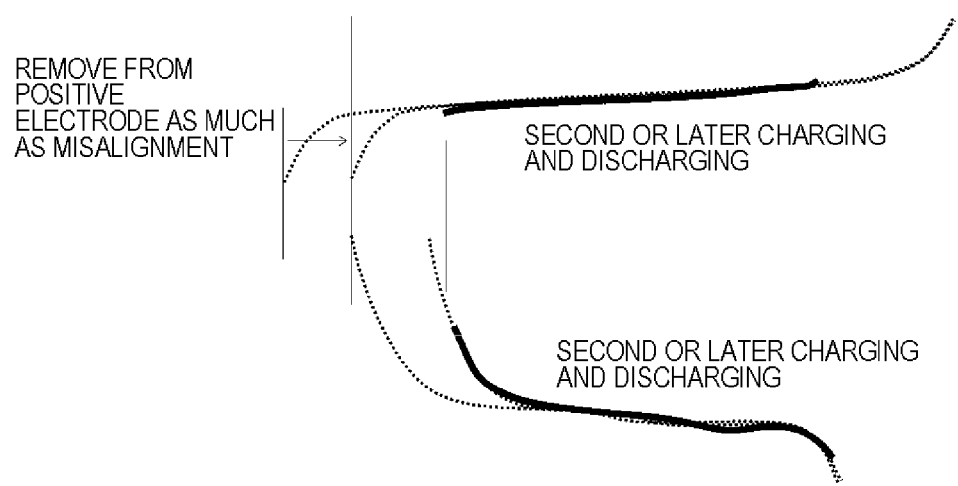
FIG. 4 is a schematic view for describing correction of the relationship between the first-time charge and discharge characteristics of the positive electrode and the first-time charge and discharge characteristics of the negative electrode in Example 1.

As one method, there is a method in which lithium in the positive electrode is consumed. For example, the positive electrode is immersed and reacted in a $NO_2BF_4$ solution, thereby chemically desorbing lithium from the positive electrode and removing a capacity of lithium from the positive electrode as much as the misalignment. A condition for removing a desired amount of lithium is determined by evaluating a relationship among the amount removed, the concentration of the solution, and the immersion time in advance. When the negative electrode and the positive electrode on which the above-described treatment has been carried out are combined together, the discharge curves of the positive and negative electrodes have a relationship of FIG. 4, and it is possible to match the relationship to the relationship of FIG. 2 from the first-time discharge.

As a separator for separating the positive electrode and the negative electrode, a 25 μm-thick microporous polypropylene film is used.

The positive electrode, the negative electrode, and the separator that have been produced as described above are respectively worked to predetermined shapes, thereby preparing a positive electrode having positive electrode active material layers on both surfaces, a negative electrode having negative electrode active material layers on both surfaces, and the separator. A plurality of the positive electrodes and a plurality of the negative electrodes are respectively laminated through the separators, thereby assembling an electrode element. The obtained electrode element is encased with an aluminum laminate film that is an exterior body, and the electrolytic solution is injected thereinto. After that, the aluminum laminate film is sealed in, for example, a reduced-pressure atmosphere of 0.1 atmospheres, whereby it is possible to produce a lithium ion secondary battery. A positive electrode tab is connected to the positive electrode current collector in the positive electrode, and a negative electrode tab is connected to the negative electrode current collector in the negative electrode, thereby forming a state in which the positive electrode and the negative electrode can be respectively electrically connected from the outside of the exterior body through the positive electrode tab and the negative electrode tab.

The positive and negative electrode charge and discharge characteristics of the present lithium ion secondary battery has the relationship of FIG. 2 in the initial stage of using the product, and thus charging ends by a decrease in the potential of the negative electrode, and discharging ends by an increase in the potential of the negative electrode. In a case where lithium ions are lost due to a decomposition reaction of the electrolytic solution during the charge and discharge cycle or a reaction with an eluted electrode component, lithium in the positive electrode is discharged until the charging of the negative electrode is completed, and thus the capacity seldom changes. At this time, in the relationship between the positive and negative electrode characteristics, the charge and discharge curve of the positive electrode is shifted to the left with respect to the charge and discharge curve of the negative electrode. As the shift proceeds, the amount of the potential of the positive electrode increased during charging gradually increases, and, in the end, the end of charging is determined by an increase in the potential of the positive electrode. In such a case, the capacity begins to decrease in association with the shift, but the battery can be used until the capacity reaches a capacity lower limit necessary for the use of the battery. As such, the present example enables the realization of a battery having a long service life.

Example 2

As a negative electrode material of the present example, the material in Example 1 and a polyimide are mixed together. A slurry for a negative electrode is uniformly applied onto a 10 µm-thick Cu current collector. The slurry for a negative electrode is dried, then, thermally treated at 200° C. for two hours, and then compressed using a roll press, thereby producing a negative electrode.

A non-aqueous electrolytic solvent and a positive electrode are produced in the same manner as in Example 1. However, the chemical lithium desorption treatment is not carried out on the positive electrode.

As a separator for separating the positive electrode and the negative electrode, a 20 µm-thick laminate film of microporous polyethylene and aramid is used.

A method for producing a lithium ion secondary battery is identical to that in Example 1.

Figure 5:
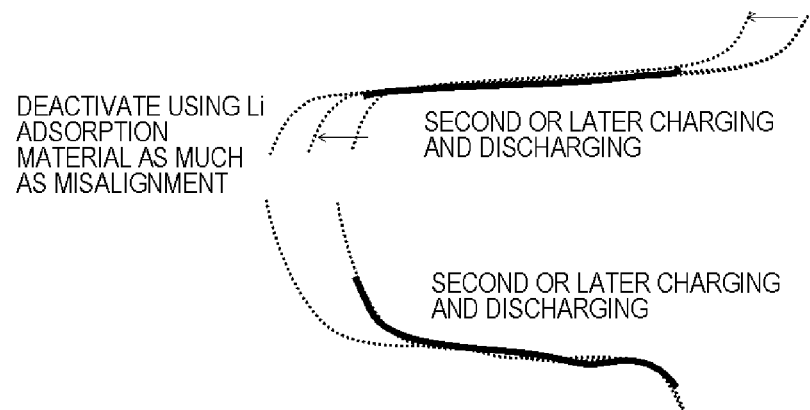
FIG. 5 is a schematic view for describing the correction of the relationship between the first-time charge and discharge characteristics of the positive electrode and the first-time charge and discharge characteristics of the negative electrode in Example 2.

In the present example, the polyimide in the negative electrode has a characteristic of irreversibly storing some of lithium, and thus, out of lithium inserted into the negative electrode from the positive electrode, lithium that is stored in the polyimide is deactivated. When the relationship between the amount of the polyimide and the amount of lithium deactivated is evaluated, it is possible to remove a desired amount of lithium, the misalignment in FIG. 3 is adjusted, and the relationship of the positive and negative electrode charge and discharge characteristic of FIG. 5 can be realized.

In the present example, the amount of lithium removed can be controlled using the amounts of the materials mixed, and thus there is an advantage that the manufacturing is easy.

Comparative Example 1

Comparative Example 1 is a lithium ion secondary battery in which the constitution is identical to that in Example 1, but the chemical lithium desorption treatment is not carried out on the positive electrode.

At this time, the relationship of the charge and discharge curve between the positive electrode and the negative electrode becomes as shown in FIG. 3. In this case, the amount of lithium ions that are discharged from the positive electrode is larger than the capacity of the negative electrode, and thus lithium ions are precipitated on the negative electrode, and thus there is a possibility that the negative electrode may be short-circuited with the positive electrode and the generation of smoke or ignition may be caused.

Example 3

As a negative electrode active material of the present example, SiO coated with a poorly crystalline carbon material is used. SiO, a conductive auxiliary agent that is a spherical carbon material, a conductive auxiliary agent that is a flake-like carbon material, and a polyimide are mixed together and dispersed in N-methylpyrrolidone, thereby preparing a slurry for a negative electrode. The slurry for a negative electrode is uniformly applied onto a 10 µm-thick stainless steel current collector. The slurry for a negative electrode is dried, then, thermally treated at 240° C. for one hour, and compressed using a roll press, thereby producing a negative electrode.

As a non-aqueous electrolytic solvent, the same non-aqueous electrolytic solvent as in Example 1 is used.

$LiNi_{0.85}Co_{0.10}Al_{0.05}O_2$ that is a positive electrode active material, polyvinylidene fluoride (4% by mass) that is a binding agent for a positive electrode, and carbon black that is a conductive auxiliary agent are mixed together, thereby preparing a positive electrode mixture. The positive electrode mixture is dispersed in N-methyl-2-pyrrolidone, thereby preparing a slurry for a positive electrode in which the positive electrode active material and the carbon black are uniformly dispersed in an NMP solution of PVDF. The slurry for a positive electrode is uniformly applied to both surfaces of a 20 µm-thick aluminum positive electrode current collector. Coating layers of the slurry for a positive electrode are dried and then compressed using a roll press, thereby forming a positive electrode active material and producing a positive electrode.

Figure 6:
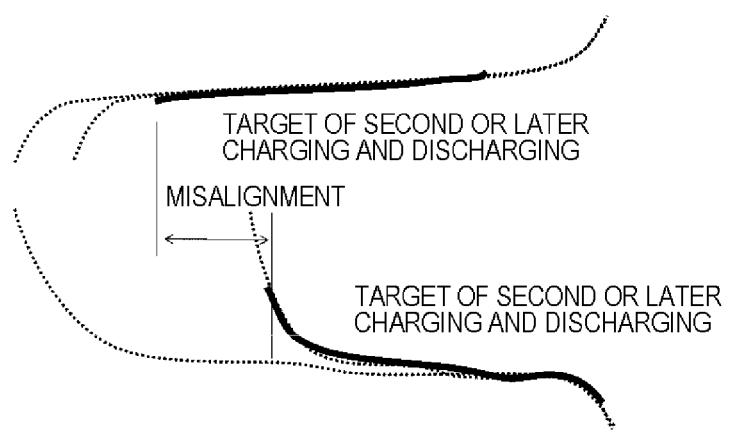
FIG. 6 is a view showing an example of the relationship between the first-time charge and discharge characteristics of the positive electrode and the first-time charge and discharge characteristics of the negative electrode in the case of using an electrode element in which the negative electrode has a larger irreversible capacity than the positive electrode.

A relationship between first-time charge and discharge curves of the obtained negative electrode and the obtained positive electrode when both electrodes are combined together is shown in FIG. 6. In the present constitution, the negative electrode has a larger irreversible capacity than the positive electrode, and thus there is "misalignment" compared to the target positional relationship of FIG. 2, and a treatment that corrects the misalignment becomes necessary.

Figure 7:
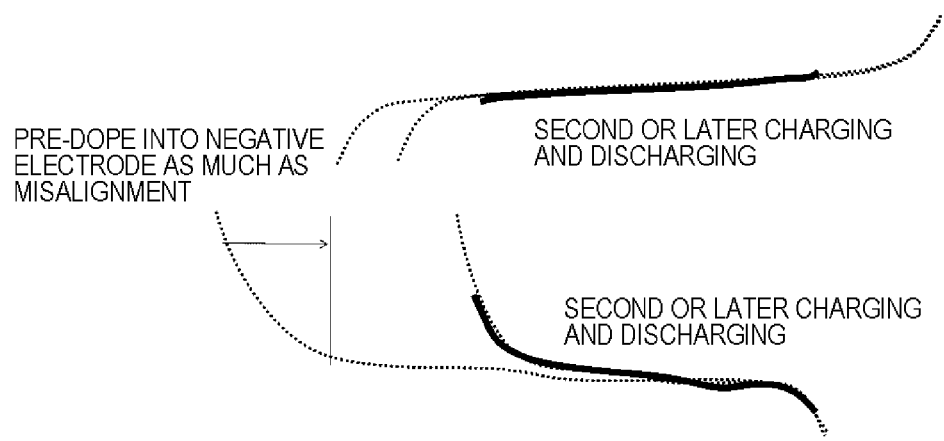
FIG. 7 is a schematic view for describing the correction of the relationship between the first-time charge and discharge characteristics of the positive electrode and the first-time charge and discharge characteristics of the negative electrode in Example 3.

As one method, there is a method in which lithium is added to the negative electrode before assembly. For example, there is a method in which Li is deposited on a surface of the negative electrode and dispersed by a thermal treatment, a method in which a negative electrode is immersed in an electrolytic solution in which Li metal is disposed as a positive electrode, and a potential is imparted between the positive and negative electrodes, thereby storing Li in the negative electrode, or the like. The amount of lithium added is controlled by evaluating a relationship among the amount of lithium, the amount of a current, and the immersion time in advance. When the negative electrode and the positive electrode on which the above-described treatment has been carried out are combined together, the discharge curves of the positive and negative electrodes have a relationship of FIG. 7, and it is possible to match the relationship to the relationship of FIG. 2 from the first-time discharge.

As a separator for separating the positive and negative electrodes, a 25 µm-thick microporous polyethylene film is used.

A lithium ion secondary battery is produced in the same manner as in Example 1.

In the present example, in a case where the irreversible capacity of the negative electrode is large and, in such a state, the relationship between the positive and negative electrodes becomes as shown in FIG. 6, it becomes possible to correct the relationship to the relationship of FIG. 2.

Example 4

A negative electrode in the present example is identical to that in Example 3.

$LiNi_{0.5}Mn_{1.5}O_4$ exhibits that is a positive electrode active material, polyvinylidene fluoride (4% by mass) that is a binding agent for a positive electrode, and carbon black that is a conductive auxiliary agent are mixed together, thereby preparing a positive electrode mixture.

Ina case where the obtained negative electrode and the obtained positive electrode are used as they are, the charge and discharge curves of the positive and negative electrodes becomes the relationship of FIG. 6. As a method for correcting misalignment, there is a method in which lithium is added to the positive electrode before assembly. For example, a positive electrode is placed in an electrolytic solution in which Li metal is disposed as a negative electrode, a voltage is applied between the positive and negative electrodes, and the positive and negative electrodes are further discharged. A positive electrode material in the present example has a capacity in a discharge range, and thus lithium is stored.

A non-aqueous electrolytic solvent is produced in the same manner as in Example 1.

As a separator for separating the positive and negative electrodes, a 20 μm-thick laminate film of microporous polyethylene and aramid is used.

A method for producing a lithium ion secondary battery is identical to that in Example 1.

Figure 8:
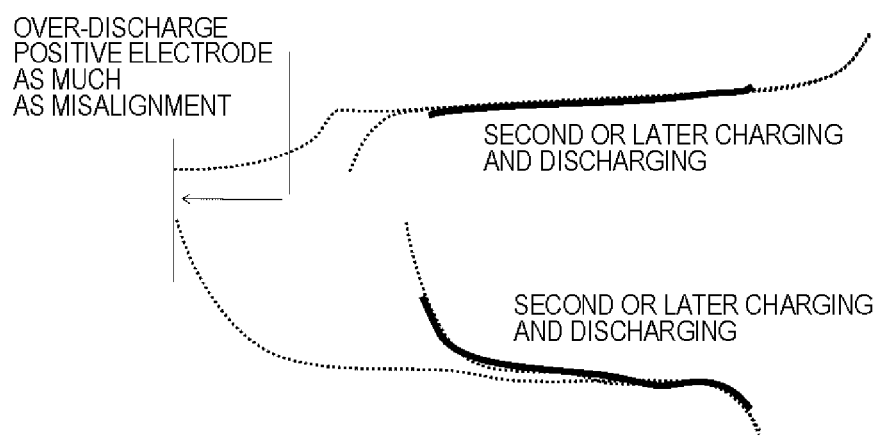
FIG. 8 is a schematic view for describing the correction of the relationship between the first-time charge and discharge characteristics of the positive electrode and the first-time charge and discharge characteristics of the negative electrode in Example 4.

In the present example, the battery is formed after the positive electrode is over-discharged, whereby the misalignment of FIG. 6 is adjusted, and the relationship is corrected to a relationship of FIG. 8, whereby it is possible to match the relationship to the relationship of FIG. 2 from the first-time discharge.

Comparative Example 2

Comparative Example 2 is a lithium ion secondary battery in which the constitution is identical to that in Example 3, but lithium is not added to the negative electrode.

At this time, the relationship of the charge and discharge curve between the positive electrode and the negative electrode becomes as shown in FIG. 6. In this case, when lithium is absorbed and lost in a substance generated by the decomposition of the electrolytic solution during the charge and discharge cycle, lithium that is inserted into the positive electrode during discharging decreases, and thus the capacity decreases.

Hitherto, the present invention has been described with reference to the embodiments and the examples, but the present invention is not limited to the embodiment and the examples. The constitution or detail of the present invention can be modified in diverse manners that a person skilled in the art can understand within the scope of the present invention.

The invention claimed is:

1. A method for using a secondary battery by using some of a capacity of a positive electrode and an entire capacity of a negative electrode, wherein the secondary battery includes at least the positive electrode, the negative electrode, a separation layer that spatially separates the positive electrode and the negative electrode, and an ion conductor that is held between the positive electrode and the negative electrode and has a function of conducting ions between the positive electrode and the negative electrode,
wherein, in an initial stage of using the secondary battery, the secondary battery is used under a condition of a potential increase rate of the positive electrode immediately before completion of full charging being smaller than a potential decrease rate of the negative electrode immediately before the completion of full charging and is used under a condition of a potential decrease rate of the positive electrode immediately before completion of full discharging being smaller than a potential increase rate of the negative electrode immediately before the completion of full discharging.

2. The method for using the secondary battery according to claim 1,
wherein the secondary battery is continuously used until a state in which the potential increase rate of the positive electrode immediately before the completion of full charging becomes larger than the potential decrease rate of the negative electrode immediately before the completion of full charging.

3. The method for using the secondary battery according to claim 1,
wherein, in the initial stage of using the secondary battery, the secondary battery is used under a condition in which, when discharging is carried out with a constant current of 1/20 C, a ratio ($\Delta V_2/\Delta V_1$) of an absolute value ($\Delta V_2$) of an amount of a potential changed per 10 mAh/g of the positive electrode immediately before the completion of full discharging to an absolute value ($\Delta V_1$) of an amount of a potential changed per 10 mAh/g of the negative electrode immediately before the completion of full discharging satisfies a relationship $\Delta V_2/\Delta V_1 < 1$.

4. The method for using the secondary battery according to claim 1,
wherein, in the initial stage of using the secondary battery, the secondary battery is used under a condition in which, when charging is carried out with a constant current of 1/20 C, a ratio ($\Delta V_4/\Delta V_3$) of an absolute value ($\Delta V_4$) of an amount of a potential changed per 10 mAh/g of the positive electrode immediately before the completion of full charging to an absolute value ($\Delta V_3$) of an amount of a potential changed per 10 mAh/g of the negative electrode immediately before the completion of full charging satisfies a relationship $\Delta V_4/\Delta V_3 < 1$.

5. The method for using the secondary battery according to claim 1,
wherein the secondary battery is continuously used until a state in which, when charging is carried out with a constant current of 1/20 C, a ratio ($\Delta V_4/\Delta V_3$) of an absolute value ($\Delta V_4$) of an amount of a potential changed per 10 mAh/g of the positive electrode immediately before the completion of full charging to an absolute value ($\Delta V_3$) of an amount of a potential changed per 10 mAh/g of the negative electrode immediately before the completion of full charging satisfies a relationship $\Delta V_4/\Delta V_3 > 1$.

6. The method for using the secondary battery according to claim 1,
wherein, in the initial stage of using the secondary battery, excess conduction ions are present in the positive electrode at the time of completing full charging.

7. The method for using the secondary battery according to claim 6,
wherein, in a period of time of the secondary battery being used, when the conduction ions that contribute to charging and discharging decrease, the decreased conduction ions are compensated for by the excess conduction ions in the positive electrode.

8. The method for using the secondary battery according to claim 1, wherein the secondary battery is a lithium ion secondary battery.

* * * * *